United States Patent [19]

Sleight

[11] Patent Number: 5,322,559
[45] Date of Patent: Jun. 21, 1994

[54] NEGATIVE THERMAL EXPANSION MATERIAL

[75] Inventor: Arthur W. Sleight, Philomath, Oreg.

[73] Assignee: State of Oregon Acting By and Through the State Board of Higher Education on Behalf of Oregon State University, Corvallis, Oreg.

[21] Appl. No.: 60,567

[22] Filed: May 11, 1993

[51] Int. Cl.[5] ............................................. C01B 25/45
[52] U.S. Cl. ........................................ 106/401; 106/451; 423/306; 501/94; 501/102; 501/108; 501/123
[58] Field of Search ................... 423/306; 501/94, 102, 501/108, 123; 106/401, 451

[56] References Cited

U.S. PATENT DOCUMENTS

| | | | |
|---|---|---|---|
| 3,941,715 | 3/1976 | Shidlovsky | 423/306 |
| 4,112,194 | 9/1978 | Chenot et al. | 423/306 |
| 4,337,173 | 6/1982 | Otake | 423/306 |
| 4,675,302 | 6/1987 | Roy et al. | 423/306 |
| 4,801,566 | 1/1989 | Limaye et al. | 501/104 |
| 5,102,836 | 4/1992 | Brown et al. | 501/111 |
| 5,254,510 | 10/1993 | Matsuhiro et al. | 501/102 |

OTHER PUBLICATIONS

Komarneni, "Hydrothermal Preparation of the Low-expansion NZP Family of Materials," *Int. J. High Tech. Ceram.* 4:31-39 (1988).
Craig et al., "Zirconium Pyrovanadate Transitions," *J. Am. Ceram. Soc.* 55:532 (1972). (Only 1 page).
Yamai et al., "Low-Thermal-Expansion Polycrystalline Zirconyl Phosphate Ceramic," *J. Am. Ceram. Soc.* 68:273-278 (1985).
Harrison et al., "High-Temperature Zirconium Phosphates," *J. Am. Ceram. Soc.* 37:277-289 (1954).
Ota et al., "Thermal Expansion of $ZrP_2O_7$ and Related Solid Solutions," Japan, *J. Materials Science,* 22:3762-3764 (1987).
Buchanan et al., "Properties of Hot-Pressed Zirconium Pyrovanadate Ceramics," *J. Electrochem. Soc.: Solid-State Science and Technology,* 1905-1910, Sep. 1983.
Limaya, "New Low Thermal Expansion Materials for High Use Temperatures," *Materials and Processing Report* 4:1-2 (1989).
Laud et al., "Subsolidus Relations in the System $ZrO_2$–$ThO_2$–$P_2O_5$," *J. Am. Ceram. Soc.* 54:407-409 (1971).
Gillery et al., "Thermal Contraction of $\beta$-Eucryptite ($Li_2O \cdot Al_2O_3 \cdot 2SiO_2$) by X-Ray and Dilatometer Methods," *J. Am. Ceram. Soc.* 42:175-177 (1959).
Roy et al., "Very Low Thermal Expansion Coefficient Materials," *Ann. Rev. Mater. Sci.* 19:59-61 (1989).

*Primary Examiner*—Wayne Langel
*Attorney, Agent, or Firm*—Klarquist Sparkman Campbell Leigh & Whinston

[57] ABSTRACT

Compounds that satisfy the general formula $A_{1-Y}^{4+}A_Y^{1+}A_Y^{3+}V_{2-X}P_XO_7$ exhibit isotropic NTE behavior in the range of normal ambient temperatures. Y is from about 0.0 to about 0.4, and more preferably is about 0.2. X is from about 0.6 to about 1.4, and is more preferably about 1. Particularly suitable NTE compounds have X about 1 and Y about 0. $A^{4+}$ is selected from the group consisting of Hf, Zr, $Zr_aM_b$, $Hf_aM_b$ and mixtures thereof wherein a plus b equals one and M is selected from the group consisting of Ti, Ce, Th, U, Mo, Pt, Pb, Sn, Ge and Si. More preferably, $A^{4+}$ is selected from the group consisting of Hf and Zr. $A^{1+}$ is selected from the group consisting of the alkali earth metals, and $A^{3+}$ is selected from the group consisting of the rare earth metals. Such NTE materials exhibit isotropic negative linear expansion at a temperature below about 100° C. The NTE materials also may be incorporated into compositions such as epoxy and ceramic compositions.

34 Claims, 14 Drawing Sheets

NEGATIVE THERMAL EXPANSION MATERIAL

GOVERNMENTAL SUPPORT

This invention was made, at least in part, with governmental support. This support was provided by the United States Department of the Interior, Bureau of Mines, under agreement No. C029005. The United States government may have certain rights in this invention.

FIELD OF THE INVENTION

This invention concerns new compounds that exhibit negative thermal expansion (NTE).

BACKGROUND OF THE INVENTION

Most materials expand when they are heated and contract when they are cooled. Although it is rare, some materials expand when they are cooled, and therefore have a negative thermal expansion upon heating instead of a positive thermal expansion. Materials that exhibit a negative or a very low thermal expansion are useful primarily because of their resistance to damage from thermal shock on rapid heating or rapid cooling. This is particularly true if the magnitude of the NTE effect for a particular compound is sufficient to compensate for the positive thermal expansion coefficient of usual materials. For instance, combining NTE materials with other materials, such as ceramics and epoxies, would provide a composition that shows exceptionally low thermal expansion or contraction. Ceramics are stressed by abrupt expansion or contraction during temperature cycling, which may result in mechanical failure. "Thermal Expansion of $ZrP_2O_7$ and Related Solid Solutions," *J. Materials science*, 22:3762–3764 (1987). Thus, adding a sufficient amount of an NTE material to a ceramic to form a ceramic-NTE composition would alleviate some of the stress induced by temperature changes.

Materials that exhibit negative thermal expansion or a small positive thermal expansion are known. Unfortunately, known compounds exhibit NTE only over certain temperature ranges, particularly temperatures above about 150° C, and therefore are not suitable for most applications. Moreover, most known NTE materials have highly anisotropic thermal expansion. Anisotropic thermal expansion means that a compound expands in certain dimensions while contracting in at least one dimension. The magnitude of the contraction (negative expansion) in a first direction may be offset by expansion in a second direction. Hence, even though the sum of the expansion in all dimensions (the bulk expansion) may be negative, the magnitude of the negative expansion is reduced. It therefore would be preferable if the NTE was isotropic, i.e., if thermal expansion was substantially negative in each dimension. Isotropic NTE behavior also is important because anisotropic behavior may cause undesirable strain to occur in a material as it undergoes a change in temperature.

Keatite is a first example of a material that exhibits anisotropic negative linear expansion. Keatite is a rare and poorly defined form of $SiO_2$. The result of both thermal expansion and contraction in different directions (anisotropic expansion) for Keatite is a net negative thermal volume expansion. A second example of an anisotropic NTE material is $\beta$-eucryptite, which exhibits a very small volume thermal expansion. Apparently, $\beta$-eucryptite expands in one direction of the material's unit cell (a unit cell is defined as the simplest, three dimensional polyhedron that by indefinite repetition makes up the lattice of a crystal and embodies all the characteristics of its structure), whereas the unit cell contracts in a second direction. "Thermal Contraction of $\beta$-Eucryptite ($Li_2O\cdot Al_2O_3\cdot 2SiO_2$) by X-ray and Dilatometer Methods," *J. Am. Ceram. Soc.*, 42:175–177 (1959). The overall thermal expansion of $\beta$-eucryptite is reported to be either slightly positive or slightly negative.

$(ZrO)_2P_2O_7$ (zirconyl phosphate) and $ZrV_2O_7$ (zirconium pyrovanadate) also are known compounds that exhibit NTE. $(ZrO)_2P_2O_7$ is a largely anisotropic material that expands in two directions while actually contracting in only one direction. More specifically, the a and c axes of the unit cell for $(ZrO)_2P_2O_7$ expand continuously with increasing temperature, while the b axis contracts. "Low-Thermal-Expansion Polycrystalline Zirconyl Phosphate Ceramic," *J. Am. Ceram. Soc.*, 68:273–278 (1985). The net effect is a small volume contraction over a limited temperature range, although ceramic materials made from $(ZrO)_2P_2O_7$ actually are reported to have a small positive thermal expansion (actual value = $+2.0\times 10^{-6}/°C$.). Zirconium pyrovanadate also has been shown to exhibit negative thermal expansion. However, NTE for this compound occurs only above a temperature of about 150° C. "Properties of Hot-Pressed Zirconium Pyrovanadate Ceramics," *J. Electrochem. Soc.*, 130:1905–1910 (1983).

In addition to the NTE materials described above, compounds of the type $A^{4+}P_2O_7$ exist where $A^{4+}$ may be Th, U, Cs, Hf, Zr, Ti, Mo, Pt, Pb, Sn, Ge or Si. The basic structure for such compounds may be thought of as related to the NaCl structure. NaCl molecules are arranged in cubes wherein the Na+ and the Cl− ions are located at alternating corners of the cube. With $A^{4+}$-$P_2O_7$ compounds, $A^{4+}$ has replaced Na+, and the $(P_2O_7)^{4-}$ group has replaced Cl−. Some compounds of the $A^{4+}P_2O_7$ type show low thermal expansion behavior when they are at temperatures well above normal ambient temperature, and some even show NTE behavior at temperatures well above room temperature. For example, $ThP_2O_7$ shows NTE behavior above about 300° C. However, there have been no reports of NTE behavior in $A^{4+}P_2O_7$ materials at or below about 100° C.

Hence, a need exists for new materials that exhibit isotropic NTE, particularly where the temperature at which NTE behavior begins (NTE onset temperature) is within the range of normal ambient temperatures, such as less than about 100° C., and more preferably from about 0° C. to about 50° C. Furthermore, a need exists for a homologous family of NTE materials in which the NTE onset temperature for each compound is different from other compounds within the family, or wherein the NTE onset temperature can be determined by varying the atomic ratios of the constituent elements. Such a family of compounds would provide a means for selecting a particular compound, having a particular NTE magnitude and onset temperature, to be used for a particular application.

SUMMARY OF THE INVENTION

The present invention provides a new family of materials that exhibit isotropic NTE behavior in the range of normal ambient temperatures. The magnitude of the NTE effect is sufficient to overcome the positive thermal expansion of usual materials. The compounds of the present invention satisfy the general formula $A_{1-Y}^{4+}+A_Y^{1+}+A_Y^{3+}+V_{2-X}P_XO_7$. Y may vary from about 0.0 to about 0.4, and more preferably varies from about 0.1 to about 0.2. X may vary from about 0.1 to about 1.9, more preferably from about 0.5 to about 1.5, and even more preferably from about 0.6 to about 1.4. A presently preferred value of X is about 1. Particularly suitable NTE compounds within the scope of the present invention have X equal to about 1 and Y equal to about 0. Presently preferred compounds include $HfVPO_7$ and $ZrVPO_7$.

$A^{4+}$ is selected from the group consisting of Hf, Zr, $Zr_aM_b$, $Hf_aM_b$ and mixtures thereof. Where metals other than Zr or Hf are used, then the relative atomic amount of the $A^{4+}$ cation should be about 1. Thus, a plus b typically equals one. Moreover, M is selected from the group consisting of Ti, Ce, Th, U, Mo, Pt, Pb, Sn, Ge and Si. $A^{1+}$ is selected from the group consisting of the alkali earth metals and $A^{3+}$ is selected from the group consisting of the rare earth metals. An example of an NTE compound satisfying the general formula is $Zr_{0.9}Ce_{0.1}VPO_7$, wherein $A^{4+}$ is Zr and Ce, a equals 0.9, b equals 0.1, X equals 1 and Y equals 0.

The present invention also provides a compound according to the formula $A_{1-Y}^{4+}+A_Y^{1+}+A_Y^{3+}+V_{2-X}P_XO_7$, wherein X is from about 0.1 to about 1.9, more preferably from about 0.4 to about 1.6, and Y is from about 0.0 to about 0.4. $A^{4+}$ is selected from the group consisting of Hf and Zr, $A^{1+}$ is selected from the group consisting of the alkali earth metals, and $A^{3+}$ is selected from the group consisting of the rare earth metals. Again, preferred values of X are from about 0.5 to about 1.5, and even more preferably from about 0.6 to about 1.4. A presently preferred X value is about 1. Y preferably varies from about 0.0 to about 0.4, and even more preferably from about 0 to about 0.2. Preferred compounds that satisfy this formula include $ZrVPO_7$ or $HfVPO_7$. Thus, the present invention also provides compounds of the formula $A^{4+}VPO_7$ wherein $A^{4+}$ is zirconium or hafnium.

Compounds according to this invention exhibit negative thermal expansion at temperatures below about 100° C., and preferably from about −25° C. to about 100° C., and even more preferably at normal ambient temperatures. Compositions that include such NTE materials also are within the scope of this invention.

The present invention also provides a method for making compounds that exhibit isotropic NTE behavior below about 100° C. A first aqueous mixture is formed having a source of rare earth metal ions, a source of alkali ions, and a source of $A^{4+}$ ions, such as a source of hafnium or zirconium ions. A second aqueous mixture is formed having a source of vanadium ions and a source of phosphorous ions. The first and second mixtures are heated to a temperature of from about 80° C. to about 100° C. The pH of the second mixture is adjusted to about 2 by the addition of a sufficient amount of an inorganic acid, such as nitric acid. The first aqueous mixture then is combined with the second aqueous mixture, thereby forming a precipitate. The precipitate is isolated and then heated to a temperature of about 600° C. to about 800° C., for a period of time of from about 2 hours to about 6 hours, to form an NTE compound according to the present invention.

A first object of the present invention is to provide new compounds that exhibit negative linear expansion at temperatures at or about normal ambient temperatures.

Another object of the present invention is to provide new compounds that exhibit isotropic negative linear expansion at temperatures below about 100° C.

Still another object of the present invention is to provide materials in which a particular NTE onset temperature can be selected within a range of temperatures that are at or about normal ambient temperatures.

A feature of the present invention is a new family of compounds according to the formula $A_{1-Y}^{4+}+A_Y^{1+}+A_Y^{3+}+V_{2-X}P_XO_7$ wherein Y preferably is from about 0 to about 0.2, X preferably is about 1, and wherein $A^{4+}$ is selected from the group consisting of Hf and Zr, $A^{3+}$ is selected from the group consisting of the rare earth metals, and $A^{1+}$ is selected from the group consisting of alkali earth metals.

An advantage of the present invention is that compounds according to the formula $A_{1-Y}^{4+}+A_Y^{1+}+A_Y^{3+}+V_{2-X}P_XO_7$ exhibit isotropic negative linear expansion, particularly at or about normal ambient temperatures.

BRIEF DESCRIPTION OF THE DRAWING

FIG. 17 is a thermal expansion curve for $HfV_{1.9}P_{0.1}O_7$, an NTE compound according to the present invention.

DETAILED DESCRIPTION OF THE PREFERRED EMBODIMENTS

Figure 1:
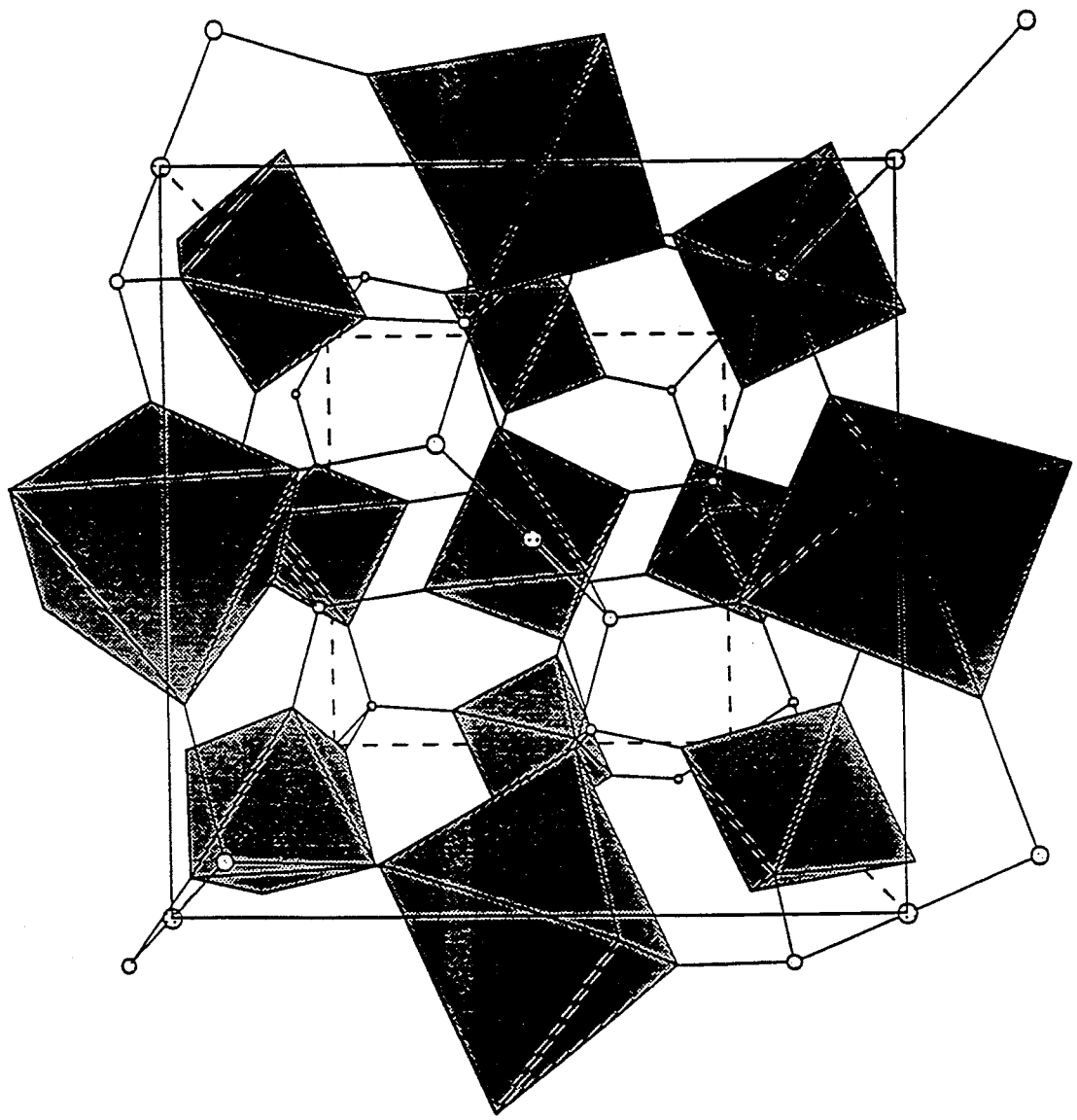
FIG. 1 is an X-ray crystal structure for an NTE compound according to the present invention.

The present invention provides a new class of NTE compounds that satisfy the general formula $A_{1-Y}^{4+}+A_Y^{1+}+A_Y^{3+}+V_{2-X}P_XO_7$ where $A^{4+}$ is selected from the group consisting of Hf, Zr, $Zr_aM_b$, and $Hf_aM_s$ wherein a plus b equals one and M is selected from the group consisting of Th, Cl, Ce, Hf, Zr, Ti, Mo, Pt, Pb, Sn, Ge or Si. $A^{1+}$ is an alkali metal such as Li and $A^{3+}$ is a rare earth metal such as Y. Compounds satisfying this general formula exhibit isotropic NTE, and more importantly typically have NTE onset temperatures at or about normal ambient temperatures. For NTE behavior at or about normal ambient temperatures, the value of Y preferably varies from about 0 to about 0.4, and more preferably from about 0.1 to about 0.2. The value of X also may vary from about 0.1 to about 1.9, preferably from about 0.4 to about 1.6, and even more preferably is about 1.0. Particularly suitable compounds according to this invention have X about 1 and Y about 0.

$ZrV_2O_7$ is a known compound that has a phase transition that occurs close to 100° C. $ZrV_2O_7$ exhibits NTE behavior if it is heated above about 100° C. The present invention demonstrates that substituting P for V causes the phase transitions to move to lower, and hence more useful temperatures. NTE behavior is still observed above these transitions. This occurs despite the fact that $ZrP_2O_7$ does not show NTE behavior at any temperature.

MAKING NTE COMPOUNDS ACCORDING TO THE PRESENT INVENTION

General Synthetic Procedures

One skilled in the art will realize that NTE materials according to this invention may be synthesized by a variety of methods. A first general method suitable for making NTE materials is to heat a source of an $A^{4+}$ species, such as $Zr^{4+}$ with vanadium oxide ($V_2O_5$) and ammonium phosphate [$(NH_4)_2HPO_4$]. Thus, $ZrVPO_7$, which is one of the NTE compounds within the scope of this invention, may be prepared by heating an intimate mixture of $ZrO_2$, $V_2O_5$ and $(NH_4)_2HPO_4$ together. The amount of each such reagent used can be varied to provide a product having a particular ratio of constituent elements. The temperature to which the reactants are heated depends on several factors, including the rate of reactivity of the reactants and the stability of the product. For instance, the product $ZrVPO_7$ is not stable above about 800° C. Hence, the temperature used to heat the reactants to form $ZrVPO_7$ should not exceed about 800° C. However, reaction rates for the reactants used to form $ZrVPO_7$ are inconveniently slow at temperatures below about 800° C. Therefore, alternate synthetic have been developed that currently are preferred over this first general method.

One such alternate synthetic route is the solid state reaction of an intimate mixture of an $A^{4+}$ oxychlorohydrate, ammonium metavanadate and ammonium phosphate. For instance, $ZrVPO_7$ can be synthesized by first forming an intimate mixture of $ZrOCl_2.8H_2O$ (zirconyl chloride octahydrate), $NH_4VO_3$ and $(NH_4)_2HPO_4$. The intimate mixture may be formed by grinding appropriate amounts of each reagent in a mortar and pestle. The intimate mixture then is heated to a temperature of from about 600° C. to about 800° C., and even more preferably from about 725° C. to about 775° C. The reaction is complete after a period of time of about two days at a presently preferred temperature of about 750° C.

A presently preferred general method for preparing NTE materials according to the present invention comprises first forming an aqueous solution containing a source of rare earth metal ions, a source of alkali earth metal ions, and a source of $A^{4+}$, such as a source of zirconium or hafnium. Suitable compounds for this purpose have been found to be oxychlorohydrates. For instance, a presently preferred source of Zr is zirconyl chloride octahydrate ($ZrOCl_2.8H_2O$). A second aqueous solution containing a source of vanadium and phosphorous then is formed. A presently suitable source of vanadium is ammonium metavanadate ($NH_4VO_3$) and a presently suitable source of phosphorous is ammonium phosphate (($NH_4)_2HPO_4$). The aqueous solutions are heated to a temperature of from about 80° C. to about 100° C., and more preferably about 90° C. The pH of the second solution then is adjusted to about 2 by adding an acid, such as nitric acid, while monitoring the change in pH. The first and second solutions then are combined and a precipitate forms. The precipitate is isolated and then heated to a temperature of from about 650° C. to about 750° C., preferably about 700° C., for a period of about 4 hours.

B. Examples

The following examples describe the actual preparation of specific NTE materials within the scope of this invention according to the general methods described above. These examples are exemplary only and should in no way be construed to limit the scope of the present invention.

EXAMPLE 1

This example describes the preparation of $ZrVPO_7$ according to the second general method described above. 5.6407 grams of $ZrOCl_2.8H_2O$ (0.01750 moles), 2.0476 grams of $NH_4VO_3$ (0.01750 moles) and 2.3116 grams of $(NH_4)_2HPO_4$ (0.01750 moles) were ground together using an agate mortar and pestle. This intimate mixture was placed in a platinum crucible and heated in air at about 750° C. for about 24 hours. The resulting material was then cooled to room temperature, reground, and finally heated again to about 750° C., again for about 24 hours.

The brown product was shown to be $ZrVPO_7$ from its X-ray diffraction pattern, as were all the structures of compounds within the scope of this invention. Table 1 below provides the X-ray data that was obtained for $ZrVPO_7$. One of skill in the art will realize that this data can be used to determine the structure of the NTE compounds of the present invention.

TABLE 1

CALCULATED AND OBSERVED INTENSITIES FOR $ZrVPO_7$

| hkl | d Calc | d Obs | I Calc | I Obs | hkl | d Calc | d Obs | I Calc | I Obs |
| --- | --- | --- | --- | --- | --- | --- | --- | --- | --- |
| 111 | 4.9273 | 4.9324 | 29 | 28 | 441 | 1.4856 | | <1 | — |
| 200 | 4.2671 | 4.2709 | 100 | 100 | 443 | 1.4636 | | <1 | — |
| 210 | 3.8167 | 3.8200 | 52 | 50 | 351 | 1.4426 | 1.4432 | 6 | 5 |
| 211 | 3.4841 | 3.4867 | 49 | 46 | 442 | 1.4224 | 1.4230 | 7 | 6 |
| 220 | 3.0173 | 2.9908 | 30 | 30 | 610 | 1.4030 | | 1 | — |
| 221 | 2.8448 | | <1 | — | 532 | 1.3844 | 1.3850 | 3 | 3 |
| 311 | 2.5732 | 2.5745 | 41 | 41 | 620 | 1.3494 | 1.3498 | 3 | 3 |
| 222 | 2.4636 | 2.4650 | 9 | 8 | 621 | 1.3328 | | 1 | — |
| 230 | 2.3670 | 2.3681 | 11 | 8 | 451 | 1.3169 | | 1 | — |
| 231 | 2.2809 | 2.2822 | 2 | 1 | 533 | 1.3015 | 1.3019 | 5 | 4 |

TABLE 1-continued
CALCULATED AND OBSERVED INTENSITIES FOR ZrVPO$_7$

| hkl | d Calc | d Obs | I Calc | I Obs | hkl | d Calc | d Obs | I Calc | I Obs |
|---|---|---|---|---|---|---|---|---|---|
| 400 | 2.1336 |        | <1 | —  | 622 | 1.2866 | 1.2872 | 5  | 4 |
| 410 | 2.0699 | 2.0710 | 7  | 6  | 630 | 1.2722 | 1.2727 | 2  | 1 |
| 411 | 2.0116 | 2.0124 | 4  | 4  | 361 | 1.2583 | 1.2589 | 1  | 1 |
| 331 | 1.9579 | 1.9587 | 8  | 10 | 444 | 1.2318 |        | <1 | — |
| 420 | 1.9083 | 1.9092 | 19 | 21 | 632 | 1.2192 |        | <1 | — |
| 421 | 1.8623 | 1.8631 | 5  | 5  | 453 | 1.2069 |        | 1  | — |
| 332 | 1.8195 |        | 1  | —  | 711 | 1.1950 | 1.1955 | 1  | 1 |
| 422 | 1.7421 | 1.7428 | 18 | 17 | 460 | 1.1835 | 1.1838 | 4  | 3 |
| 430 | 1.7069 |        | 1  | —  | 270 | 1.1723 |        | 1  | — |
| 431 | 1.6737 |        | <1 | —  | 721 | 1.1614 |        | 1  | — |
| 511 | 1.6424 | 1.6430 | 24 | 24 | 642 | 1.1404 | 1.1407 | 4  | 3 |
| 342 | 1.5848 | 1.5854 | 3  | 3  | 722 | 1.1304 |        | <1 | — |
| 251 | 1.5581 | 1.5588 | 3  | 2  | 553 | 1.1111 | 1.1114 | 7  | 9 |
| 440 | 1.5087 | 1.5093 | 10 | 11 |     |        |        |    |   |

Space Group Pa3 no 205

FIG. 1 shows a crystal structure typical of compounds according to this invention. Below the transition temperatures, the actual structure is somewhat more complex than that given in FIG. 1. The unit cell becomes larger, and all three crystallographic axes are tripled. As a result, the true symmetry may no longer be cubic, but the three crystallographic axes remain equal to each other as far as can be determined from X-ray diffraction data.

EXAMPLE 2

This example describes the preparation of ZrVPO$_7$ according to the third general method described above. 5.6407 grams of ZrOCl$_2$.8H$_2$O (0.01750 moles) were dissolved in 50 ml of water to form solution A. 2.0475 grams of NH$_4$VO$_3$ (0.01750 moles) and 2.3116 grams of (NH$_4$)$_2$HPO$_4$ (0.01750 moles) were dissolved in 100 ml of water to form solution B. Both solutions were heated to 90° C., and the pH of solution B was adjusted to 2.0 by adding nitric acid. Solution A was added to solution B with constant stirring. A precipitate formed at this point, and stirring was continued for one hour. The resulting dispersion was dried at 120° C. for about ten hours. A brown powder was produced by this process, which was ground and placed in a platinum crucible. After heating at about 700° C. for four hours, ZrVPO$_7$ was obtained as confirmed by X-ray diffraction.

EXAMPLE 3

This example describes the preparation of HfVPO$_7$. 6.2186 grams of HfOCl$_2$.8H$_2$O (0.01518 moles) were dissolved in 50 ml of water to form solution A. 1.7762 grams of NH$_4$VO$_3$ (0.01518 moles) and 2.0052 grams of (NH$_4$)$_2$HPO$_4$ (0.01518 moles) were dissolved in 100 ml of water to form solution B. Both solutions were heated to 90° C., and the pH of solution B was adjusted to 2.0 by adding nitric acid. Solution A was added to solution B with constant stirring, and a precipitate formed. Stirring was continued for one hour, and the dispersion was dried at 120° C. for ten hours. The resulting brown powder was ground and placed in a platinum crucible. After heating the brown powder at about 700° C. for four hours, HfVPO$_7$ was obtained as confirmed by X-ray diffraction. HfVPO$_7$ satisfies the general formula with A$^{4+}$ equal to Hf, y is zero and X is 1.

EXAMPLE 4

This example describes the preparation of Zr$_{0.9}$Li$_{0.1}$Y$_{0.1}$VPO$_7$. 5.2909 grams of ZrOCl$_2$.8H$_2$O (0.01642 moles) were dissolved in 50 ml of water to form solution A. 2.1341 grams of NH$_4$VO$_3$ (0.01824 moles), 2.4092 grams of (NH$_4$)$_2$HPO$_4$ (0.01824 moles), 0.1030 grams of Y$_2$O$_3$ (0.00046 moles), and 0.0629 grams of LiNO$_3$ (0.00091 moles) were dissolved in 100 ml of water to form solution B. Both solutions were heated to 90° C., and the pH of solution B was adjusted to 2.0 by adding nitric acid. Solution A was added to solution B with constant stirring, and a precipitate formed. Stirring was continued for one hour. This dispersion then was dried at about 120° C. for about ten hours. The resulting brown powder was ground and placed in a platinum crucible. After heating at 700° C. for four hours, Zr$_{0.9}$Li$_{0.1}$Y$_{0.1}$VPO$_7$ was obtained as confirmed by X-ray diffraction. Zr$_{0.9}$Li$_{0.1}$Y$_{0.1}$VPO$_7$ satisfies the general formula wherein A$^{4+}$ is Zr, A$^{3+}$ is Y, A$^{1+}$ is Li, Y is 0.1 and X is 1.

EXAMPLE 5

This example describes the preparation of Zr$_{0.8}$Li$_{0.2}$Y$_{0.2}$VPO$_7$. 4.9102 grams of ZrOCl$_2$.8H$_2$O (0.01524 moles) were dissolved in 50 ml of water to form solution A. 2.2281 grams of NH$_4$VO$_3$ (0.01905 moles), 2.5153 grams of (NH$_4$)$_2$HPO4 (0.01905 moles), 0.2151 grams of Y$_2$O$_3$ (0.00095 moles), and 0.1313 grams of LiNO$_3$ (0.00190 moles) were dissolved in 100 ml of water to form solution B. Both solutions were heated to 90° C., and the pH of solution B was adjusted to 2.0 by adding nitric acid. Solution A was added to solution B with constant stirring, and a precipitate formed. Stirring was continued for one hour. This dispersion then was dried at 120° C. for about ten hours. The resulting brown powder was ground and placed in a platinum crucible. After heating at 700° C. for four hours, Zr$_{0.8}$Li$_{0.2}$Y$_{0.2}$VPO$_7$ was obtained as confirmed by X-ray diffraction.

EXAMPLE 6

This example describes the preparation of ZrV$_{1.9}$P$_{0.1}$O$_7$. 5.7780 grams of ZrOCl$_2$.8H$_2$O (MW=322.25, 0.01793 moles) were dissolved in 50 ml of water to form solution A. 3.9852 grams of NH$_4$VO$_3$ (MW=116.98, 0.03407 moles), and 0.2368 grams of (NH$_4$)$_2$HPO$_4$ (MW=132.06, 0.001793 moles) were dissolved in 100 ml of water to form solution B. Both solutions were heated to 90° C., and the pH of solution B was adjusted to 2.0 by adding nitric acid. Solution A was added to solution B with constant stirring, and a precipitate formed. Stirring was continued for one hour. This dispersion then was dried at 120° C. for about ten hours. The resulting brown powder was ground and placed in a platinum crucible. After heating at 700° C. for four hours, $ZrV_{1.9}P_{0.1}O_7$ was obtained as confirmed by X-ray diffraction.

EXAMPLE 7

This example describes the preparation of $ZrV_{1.8}P_{0.2}O_7$. 5.7624 grams of $ZrOCl_2.8H_2O$ (MW=322.25, 0.01788 moles) were dissolved in 50 ml of water to form solution A. 3.7653 grams of $NH_4VO_3$ (MW=116.98, 0.03219 moles), and 0.4723 grams of $(NH_4)_2HPO_4$ (MW=132.06, 0.003576 moles) were dissolved in 100 ml of water to form solution B. Both solutions were heated to 90° C., and the pH of solution B was adjusted to 2.0 by adding nitric acid. Solution A was added to solution B with constant stirring, and a precipitate formed. Stirring was continued for one hour. This dispersion then was dried at 120° C. for about ten hours. The resulting brown powder was ground and placed in a platinum crucible. After heating at 700° C. for four hours, $ZrV_{1.8}P_{0.2}O_7$ was obtained as confirmed by X-ray diffraction.

In a manner similar to Examples 6 and 7, the following NTE compounds also have been made: $ZrV_{1.7}P_{0.3}O_7$, $ZrV_{1.6}P_{0.4}O_7$, $ZrV_{1.4}P_{0.6}O_7$, $ZrV_{1.2}P_{0.8}O_7$, $ZrV_{0.8}P_{1.2}O_7$, $ZrV_{0.6}P_{1.4}O_7$, $ZrV_{0.4}P_{1.6}O_7$, $ZrV_{0.2}P_{1.8}O_7$, $HfV_{1.9}P_{0.1}O_7$, $HfV_{1.8}P_{0.2}O_7$, $HfV_{1.7}P_{0.3}O_7$ and $HfV_{1.6}P_{0.4}O_7$. These compounds were made by changing the amounts of $ZrOCl_2.8H_2O$ (or $HfOCl_2.8H_2O$), $NH_4VO_3$ and $(NH_4)_2HPO_4$ in order to obtain the desired atomic ratio in each homolog of $ZrVPO_7$ (or $HfVPO_7$). The specific amounts of each reagent used to make these compounds are shown below in Table 2.

TABLE 2

|  | $ZrOCl_2.8H_2O$ or $HfOCl_2.8H_2O$ | $NH_4VO_3$ | $(NH_4)_2HPO_4$ | Annealing Temperature |
| --- | --- | --- | --- | --- |
| $ZrV_{1.7}P_{0.3}O_7$ | 5.7469 g | 3.5465 g | 0.7065 g | 700 |
| $ZrV_{1.6}P_{0.4}O_7$ | 5.7315 g | 3.3290 g | 0.9395 g | 700 |
| $ZrV_{1.4}P_{0.6}O_7$ | 5.7009 g | 2.8973 g | 1.4018 g | 700 |
| $ZrV_{1.2}P_{0.8}O_7$ | 5.6707 g | 2.4702 g | 1.8591 g | 700 |
| $ZrV_{0.8}P_{1.2}O_7$ | 5.6111 g | 1.6295 g | 2.7594 g | 750 |
| $ZrV_{0.6}P_{1.4}O_7$ | 5.5818 g | 1.2158 g | 3.2024 g | 750 |
| $ZrV_{0.4}P_{1.6}O_7$ | 5.5528 g | 0.8063 g | 3.6409 g | 750 |
| $ZrV_{0.2}P_{1.8}O_7$ | 5.5240 g | 0.4011 g | 4.0749 g | 750 |
| $HfV_2O_7$ | f6.3644 g | 3.6356 g | 0.0 g | 700 |
| $HfV_{1.9}P_{0.1}O_7$ | 6.3495 g | 3.4458 g | 0.20467 g | 700 |
| $HfV_{1.8}P_{0.2}O_7$ | 6.3347 g | 3.2568 g | 0.4085 g | 700 |
| $HfV_{1.7}P_{0.3}O_7$ | 6.3199 g | 3.0687 g | 0.6113 g | 700 |
| $HfV_{1.6}P_{0.4}O_7$ | 6.3053 g | 2.8815 g | 0.8132 g | 700 |
| $HfVPO_7$ | 6.2186 g | 1.7762 g | 2.0052 g | 700 |

Standard compounds also were made using the same general synthetic approaches discussed above. These standard compounds are known compounds that typically exhibit NTE above temperatures of about 150° C. The compounds used as standards were $(ZrO)_2P_2O_7$ and $ZrP_2O_7$. $(ZrO)_2P_2O_7$ was synthesized as described above for Examples 6 and 7. Specifically, 5.7937 grams of $ZrOCl_2.8H_2O$ (MW=322.25, 0.01798 moles) were dissolved in 50 ml of water to form solution A. 1.8975 grams of $NH_4VO_3$ (MW=116.98, 0.01622 moles) were dissolved in 100 ml of water to form solution B. Both solution A and B were heated to about 90° C., and the pH of solution B was adjusted to a pH of about 2 using nitric acid. Solutions A and B were combined and a precipitate formed. Stirring was continued for a period of about one hour, and the dispersion was thereafter dried at a temperature of about 120° C. for about ten hours. The resulting brown powder was ground and placed in a platinum crucible. The brown powder was heated at 700° C. for a period of about four hours. $(ZrO)_2VPO_7$ was obtained as confirmed by X-ray diffraction.

$ZrP_2O_7$ was synthesized in a similar manner. Specifically, 5.4957 grams of $ZrOCl_2.8H_2O$ (MW=322.25, 0.01705 moles) were dissolved in water to form solution A. 4.5043 grams of $(NH_4)_2HPO_4$ (MW=132.06, 0.03411 moles) were dissolved in 100 ml of water to form solution B. Both solution A and B were heated to about 90° C., and the pH of solution B was adjusted to a pH of about 2 using nitric acid. Solutions A and B were combined and a precipitate formed. Stirring was continued for a period of about one hour, and the dispersion was thereafter dried at a temperature of about 120° C. for about ten hours. The resulting brown powder was ground and placed in a platinum crucible. The brown powder was heated at 700° C. for a period of about four hours. $ZrP_2O_7$ was obtained as confirmed by X-ray diffraction.

EXAMPLE 8

This example describes the formation of $Zr_{0.8}Ce_{0.2}VPO_7$. 4.1813 grams of $ZrOCl_2.8H_2O$ (MW=322.25, 0.01298 moles) were dissolved in 50 ml of water to form solution A. 1.7786 grams of $(NH_4)_2Ce(NO_3)_6$ (ammonium cerium nitrate, MW=548.23, .003244 moles), 1.8975 grams $NH_4VO_3$ (MW=116.98, 0.01622 moles), and 2.1421 grams of $(NH_4)_2HPO_4$ (MW=132.06, 0.01622 moles) were dissolved in 100 ml of water to form solution B. Both solution A and B were heated to about 90° C., and the pH of solution B was adjusted to a pH of about 2 using nitric acid. Solutions A and B were combined with constant stirring and a precipitate formed. Stirring was continued for a period of about one hour, and the dispersion was thereafter dried at a temperature of about 120° C. for about ten hours. The resulting brown powder was ground and placed in a platinum crucible. The brown powder was heated at 700° C. for a period of about four hours. $Zr_{0.8}Ce_{0.2}VPO_7$ was obtained as confirmed by X-ray diffraction.

In a manner similar to Example 8, compounds having $A4+$ metal cations other than cerium, and in combination with zirconium or hafnium, can be made as long as the total relative atomic amount of the $A^{4+}$ cation is about one. For example, in $Zr_{0.8}Ce_{0.2}VPO_7$ the relative amount of zirconium is about 0.8 and the relative amount of cerium is about 0.2, so that the total relative amount of the $A^{4+}$ cation is about one. Thus, the $A^{4+}$ species in the formula $A_{1-y}^{4+}A_y^{1+}A_y^{3+}V_{2-x}P_xO_7$ may be selected from the group consisting of Hf, Zr, $Zr_aM_b$ and $Hf_aM_b$ wherein a plus b equals one and M is selected from the group consisting of Ti, Cs, Th, U, Mo, Pt, Pb, Sn, Ge and Si.

The basic structure for such compounds may be thought of as related to the NaCl structure. NaCl molecules are arranged in cubes wherein the $Na^+$ and the $Cl^-$ ions are located at alternating corners of the cube. With $A^{4+}P_2O_7$ compounds, $A^{4+}$ has replaced $Na+$, and the $(P_2O_7)^{4-}$ group has replaced $Cl^-$. Some compounds of the $A^{4+}P_2O_7$ type show low thermal expansion behavior when they are at temperatures well above normal ambient temperature, and some even show NTE behavior at temperatures well above room temperature. For example, $Th P_2O_7$ shows NTE behavior above about 300° C. However, there have been no reports of NTE behavior in $A^{4+}P_2O_7$ materials at or below about 100° C. Nevertheless, the $A^{4+}P_2O_7$ compounds all have the same basic structure. As a result, it should be possible to make compounds having this same basic structure but which are homologous to the NTE compounds described above. All such compounds should exhibit NTE. Thus, combining metals such as Ti, Ce, Th, U, Mo, Pt, Pb, Sn, Ge and Si with zirconium or hafnium to obtain the $A^{4+}$ species should produce compounds that show NTE behavior.

EXAMPLE 9

This example describes a preparation of an epoxy containing the NTE compounds of the present invention. The epoxy is particularly useful for electronic applications, such as for bonding chip components in optoelectronic devices. A suitable epoxy, such as Ablebond 69-5, sold by Ablestick Laboratories of Gardena, Calif., or EPO-TEK H61, sold by Epoxy Technology, Inc. of Billerica, Mass., is obtained. To this epoxy is added a sufficient amount of an NTE compound according to the present invention so that the resulting composition has a slightly positive, a substantially zero or a negative thermal expansion. More specifically, from about 10 volume % to about 95 volume % of an NTE compound is added to the epoxy to form an epoxy composition within the scope of the present invention.

II. NTE BEHAVIOR FOR COMPOUNDS ACCORDING TO THE PRESENT INVENTION

Compounds made according to the procedures discussed above were subjected to thermal analysis. Thermal analysis was used to determine the NTE characteristics of such compounds as a function of temperature. Thermal data was obtained using a 402 EP Dilatometer obtained from NETZSCH-Geratebau. Thermal analysis comprises determining the physical and chemical properties of a material as a function of temperature. Measurements typically are taken using a computer program that controls both the temperature and the heating rate.

Data obtained by thermal analysis for NTE compounds according to the present invention is presented as a graph of the corrected relative expansion of such materials as a function of temperature. "Corrected" means that the thermal expansion of the metal components of the Dilatometer were accounted for when testing each NTE sample. Thermal data for compounds of the present invention are presented in FIGS. 2 through 13.

A. Zirconium NTE Compounds

Figure 2:
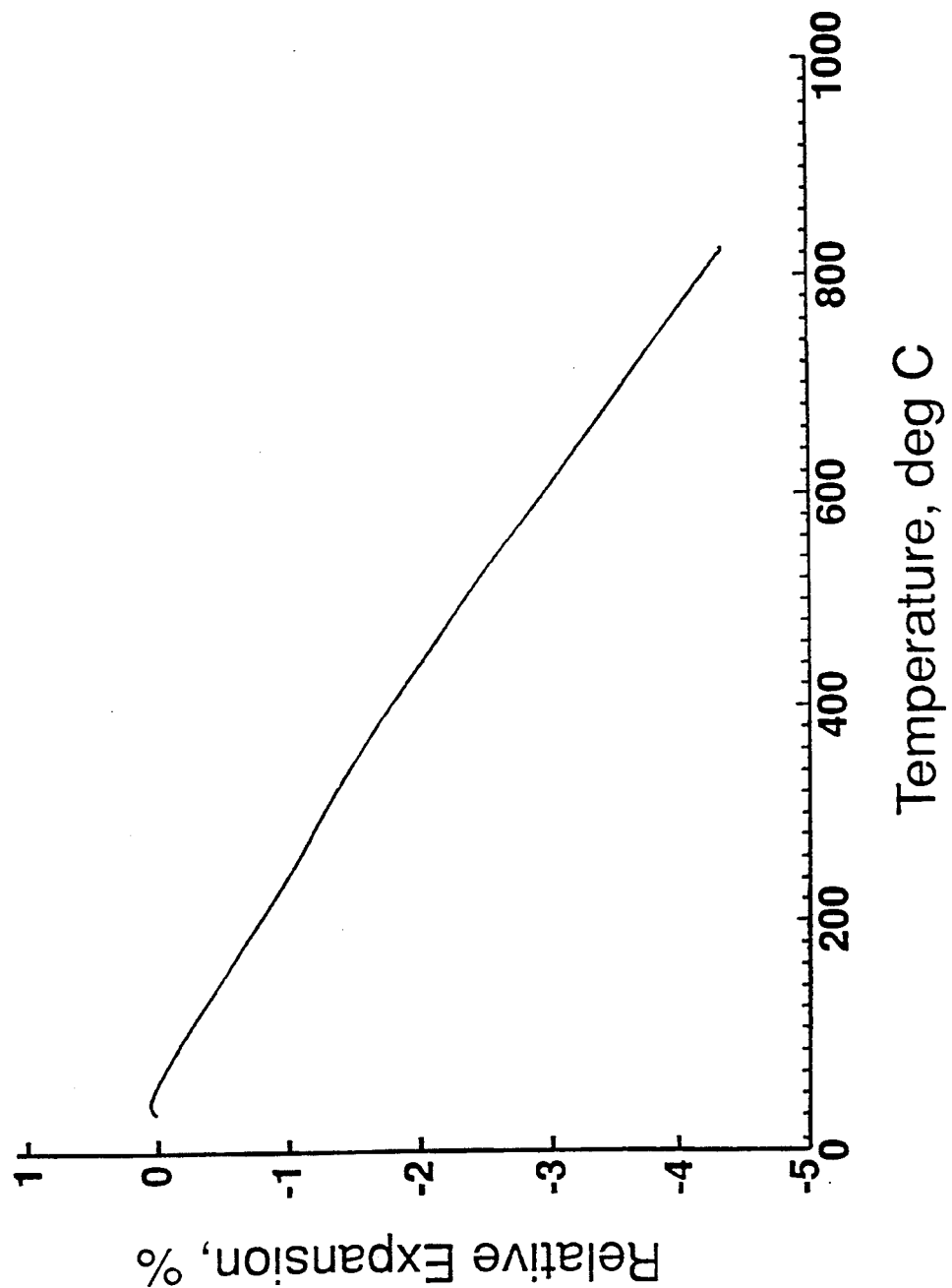
FIG. 2 is a thermal expansion curve for $(ZrO)_2V_2O_7$.

FIG. 2 is a graph of temperature versus corrected expansion in microns for $(ZrO)_2VPO_7$. $(ZrO)_2VPO_7$ is not an NTE compound according to the present invention. Rather, $(ZrO)_2VPO_7$ is a known material that shows anisotropic NTE. $(ZrO)_2VPO_7$ was used as a standard against which compounds within the scope of this invention are compared. FIG. 2 shows that $(ZrO)_2VPO_7$ has negative thermal expansion above about ambient temperature. The thermal expansion for $(ZrO)VPO_7$ is negative as shown by the negative slope of the thermal curve.

Figure 3:
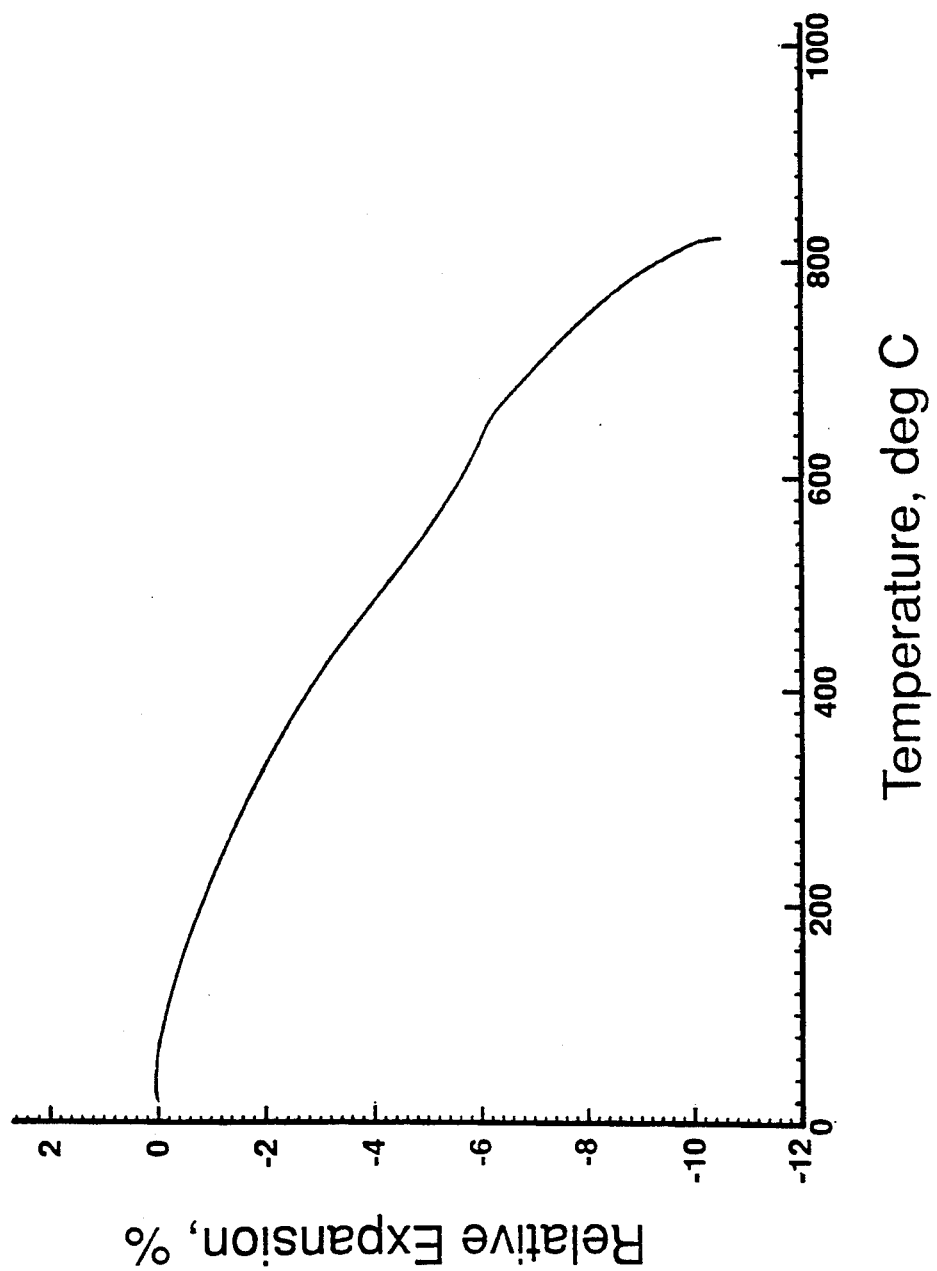
FIG. 3 is a thermal expansion curve for $ZrVPO_7$, an NTE compound according to the present invention.

FIG. 3 is a graph of temperature versus the corrected relative expansion for $ZrVPO_7$. FIG. 3 shows that $ZrVPO_7$ is an NTE material because the curve has a negative slope. Moreover, FIG. 3 shows that the NTE onset temperature for $ZrVPO_7$ is as low as about a temperature of 30° C. Thus, the addition of certain percents of phosphorous in order to form the compounds of the present invention produces materials that have isotropic NTE behavior, and has an NTE onset temperature below about 100° C.

Figure 4:
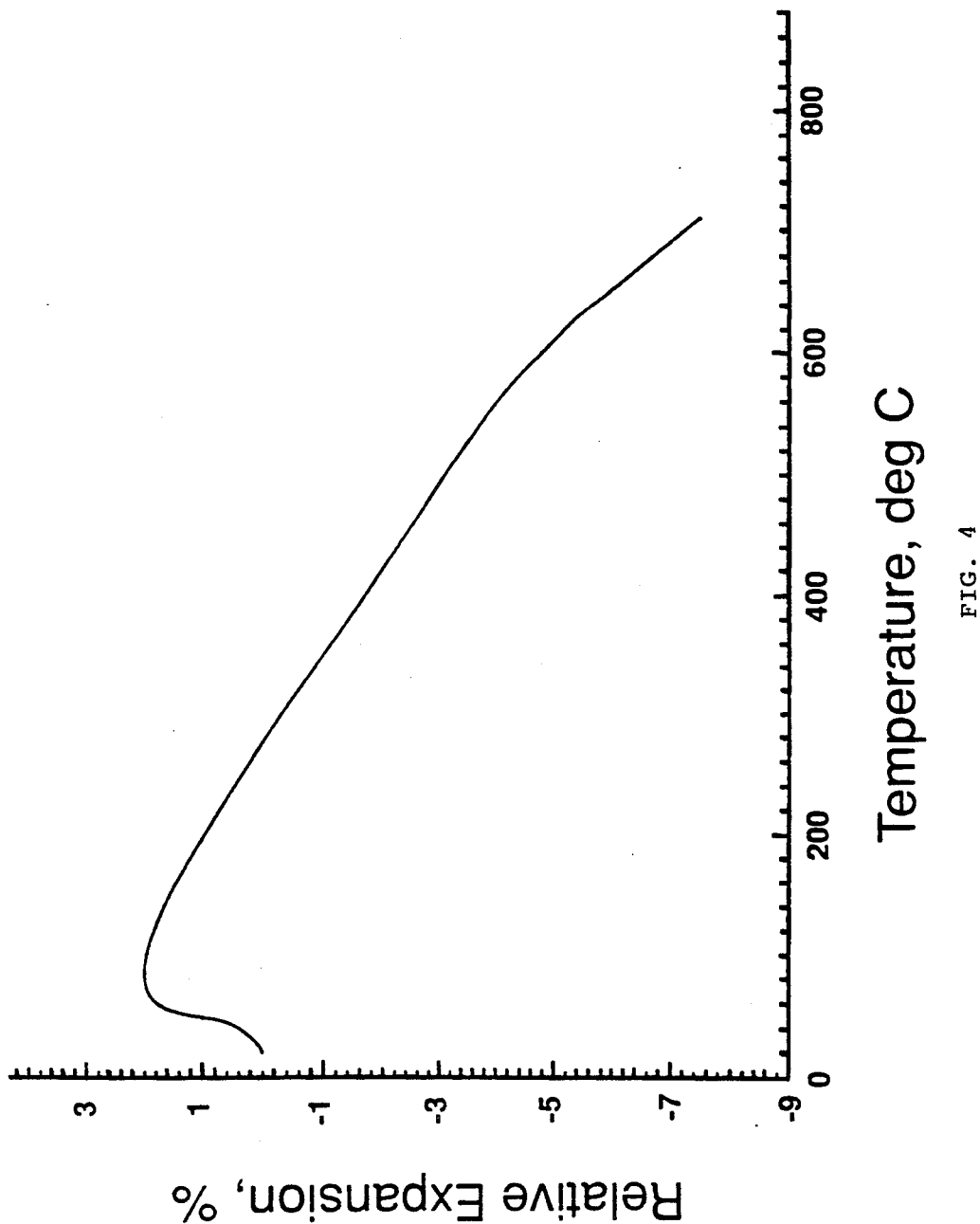
FIG. 4 is a thermal expansion curve for $ZrV_{1.7}P_{0.3}O_7$, an NTE compound according to the present invention.
Figure 5:
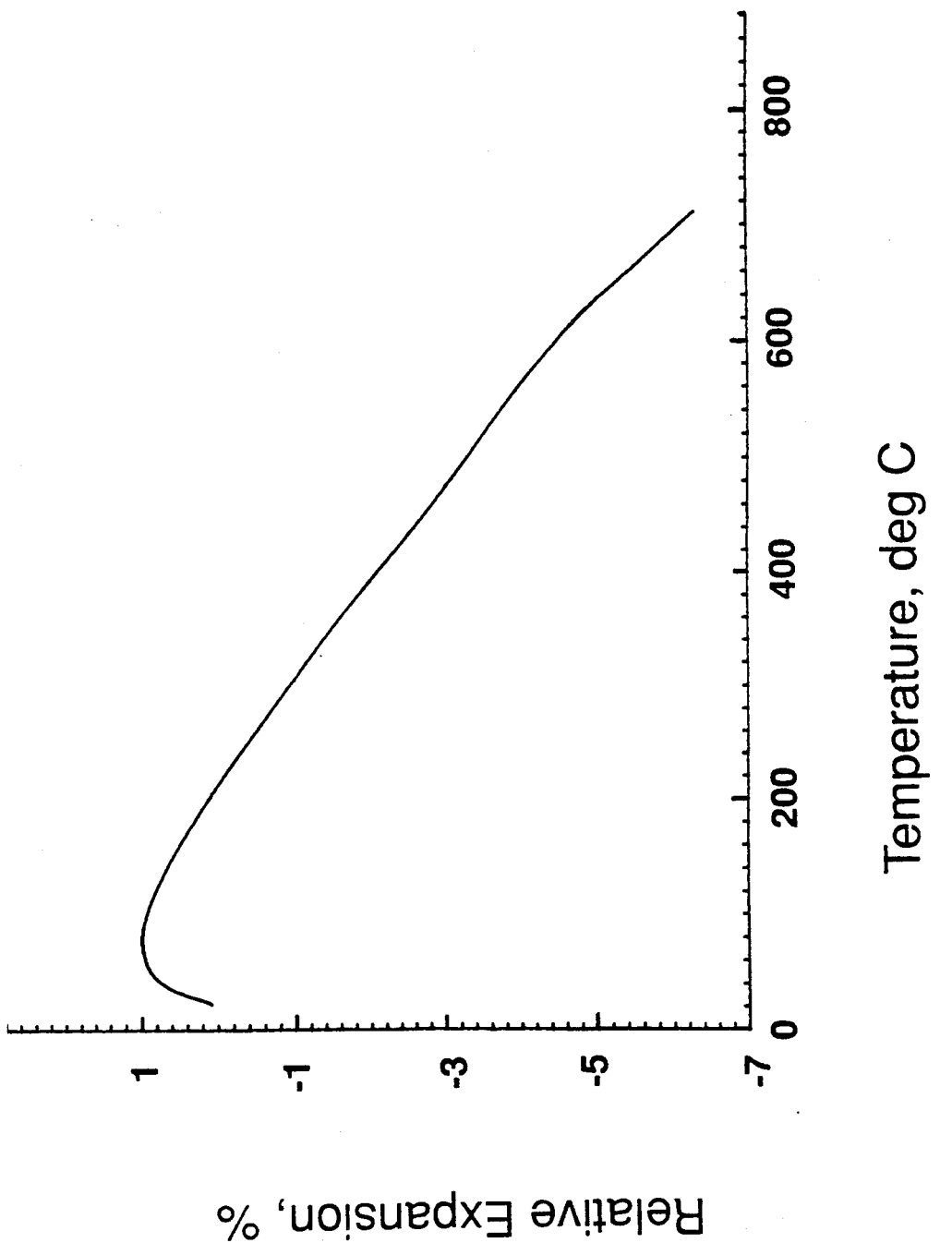
FIG. 5 is a thermal expansion curve for $ZrV_{1.6}P_{0.4}O_7$, an NTE compound according to the present invention.

FIGS. 4 and 5 are thermal expansion curves for compounds in which the ratio of phosphorous to vanadium is varied. Specifically, FIG. 4 shows the thermal expansion curve for $ZrV_{1.7}P_{0.3}O_7$, and FIG. 5 shows the thermal expansion curve for $ZrV_{1.6}P_{0.4}O_7$. FIG. 4 shows that $ZrV_{1.7}P_{0.3}O_7$ has a positive thermal expansion between the temperatures of about 20° C. to about 80° C. However, upon further heating above a temperature of about 80° C., the thermal expansion becomes negative. Similarly, FIG. 5 shows that $ZrV_{1.6}P_{0.4}O_7$ also exhibits positive thermal expansion below a temperature of about 60° C., but upon continued heating above a temperature of about 60° C. the thermal expansion for this compound becomes negative.

B. Hafnium NTE Compounds

Figure 6:
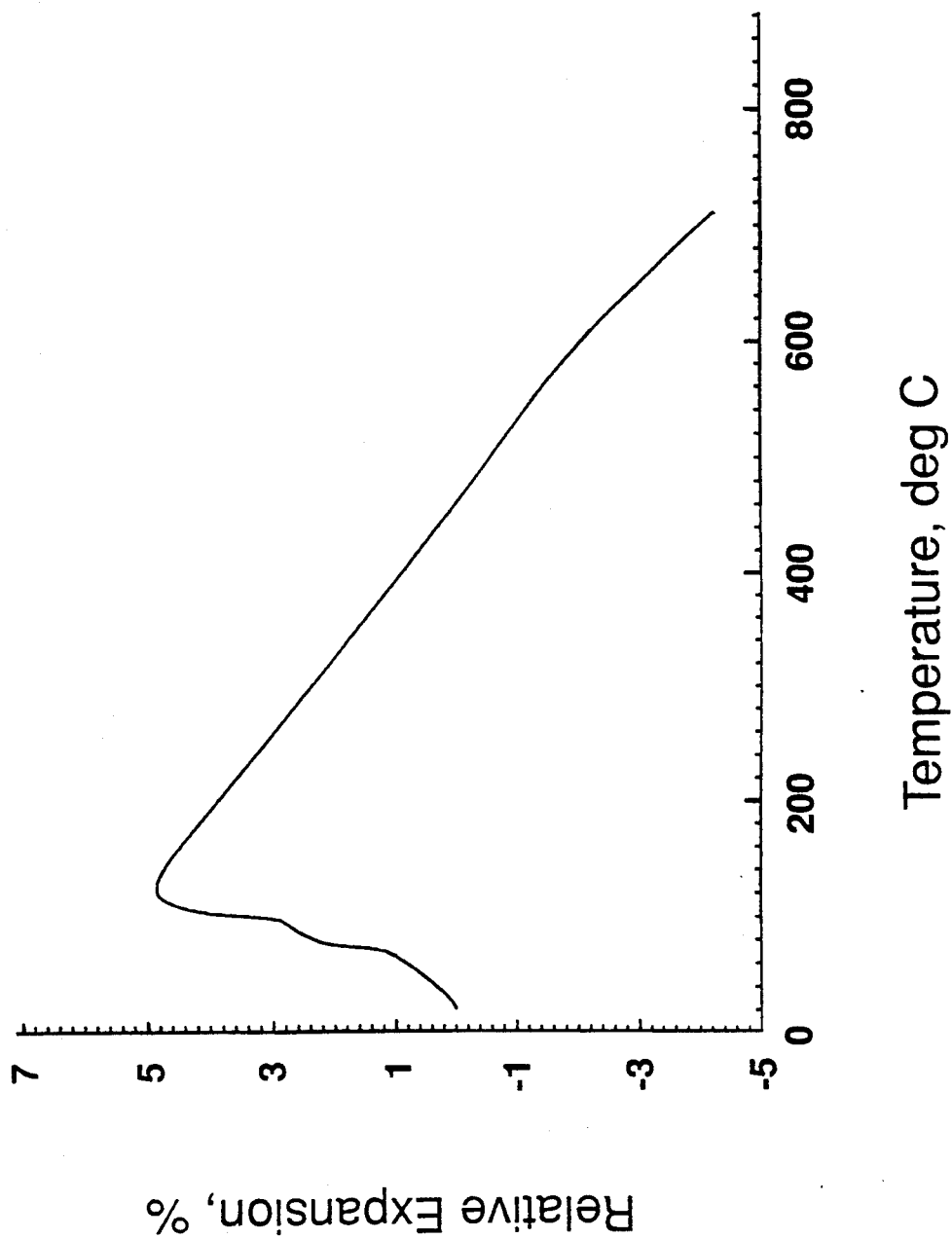
FIG. 6 is a thermal expansion curve for known compound $HfV_2O_7$.

FIG. 6 is a graph of temperature versus relative thermal expansion for $HfV_2O_7$. Again, $HfV_2O_7$ is not an NTE compound according to the present invention, but rather is included as a reference for comparing the NTE behavior for compounds within the scope of this invention. FIG. 6 shows that $HfV_2O_7$ does have NTE behavior; however, the NTE onset temperature for this compound occurs at a temperature above about 125° C.

Figure 7:
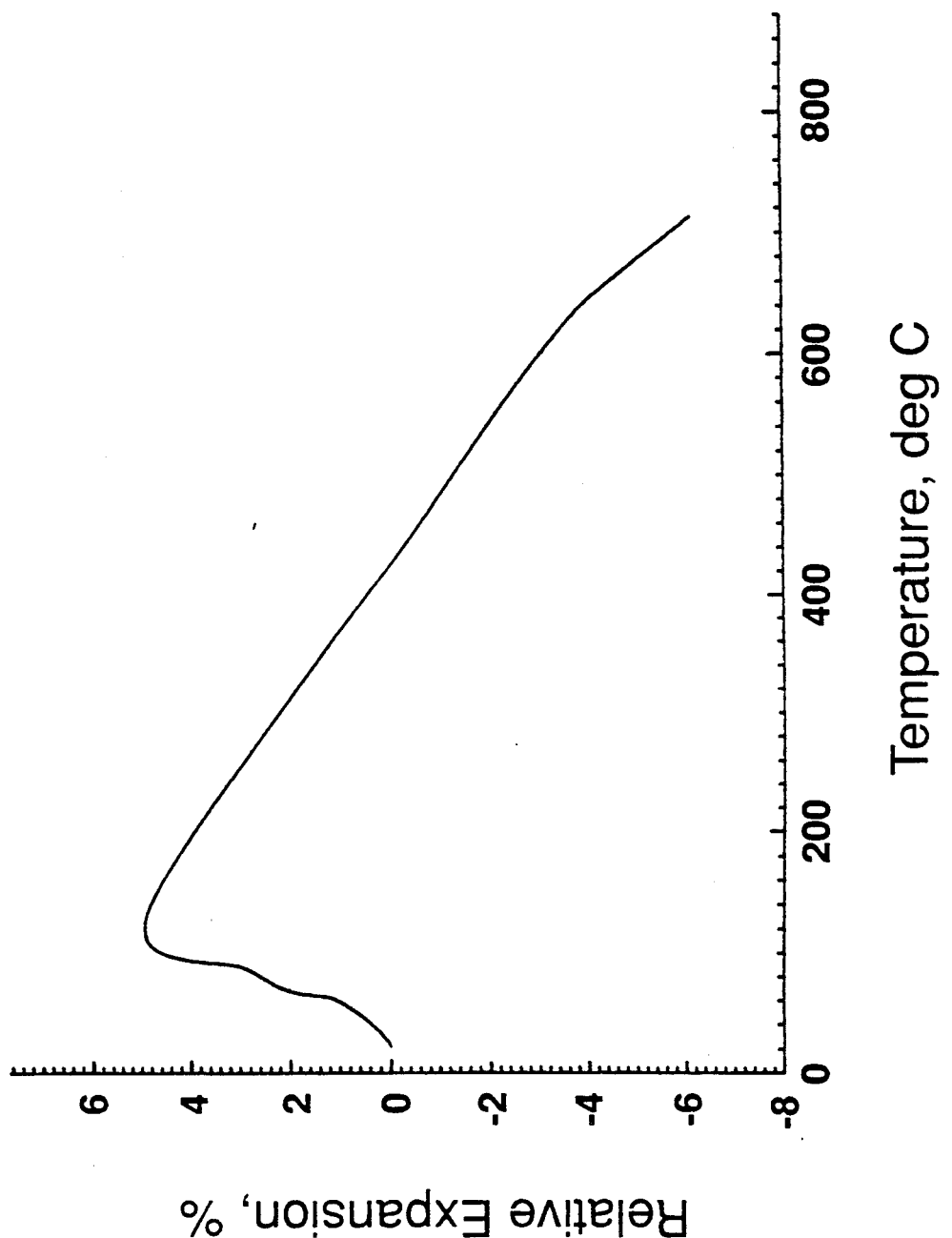

FIG. 7 is a graph of temperature versus relative expansion for $HfV_{1.9}P_{0.1}O_7$. This thermal expansion curve shows that $HfV_{1.9}P_{0.1}O_7$ has a positive thermal expansion below an onset temperature of about 125° C. $HfV_{1.9}P_{0.1}O_7$ exhibits NTE upon continued heating above this temperature.

Figure 8:
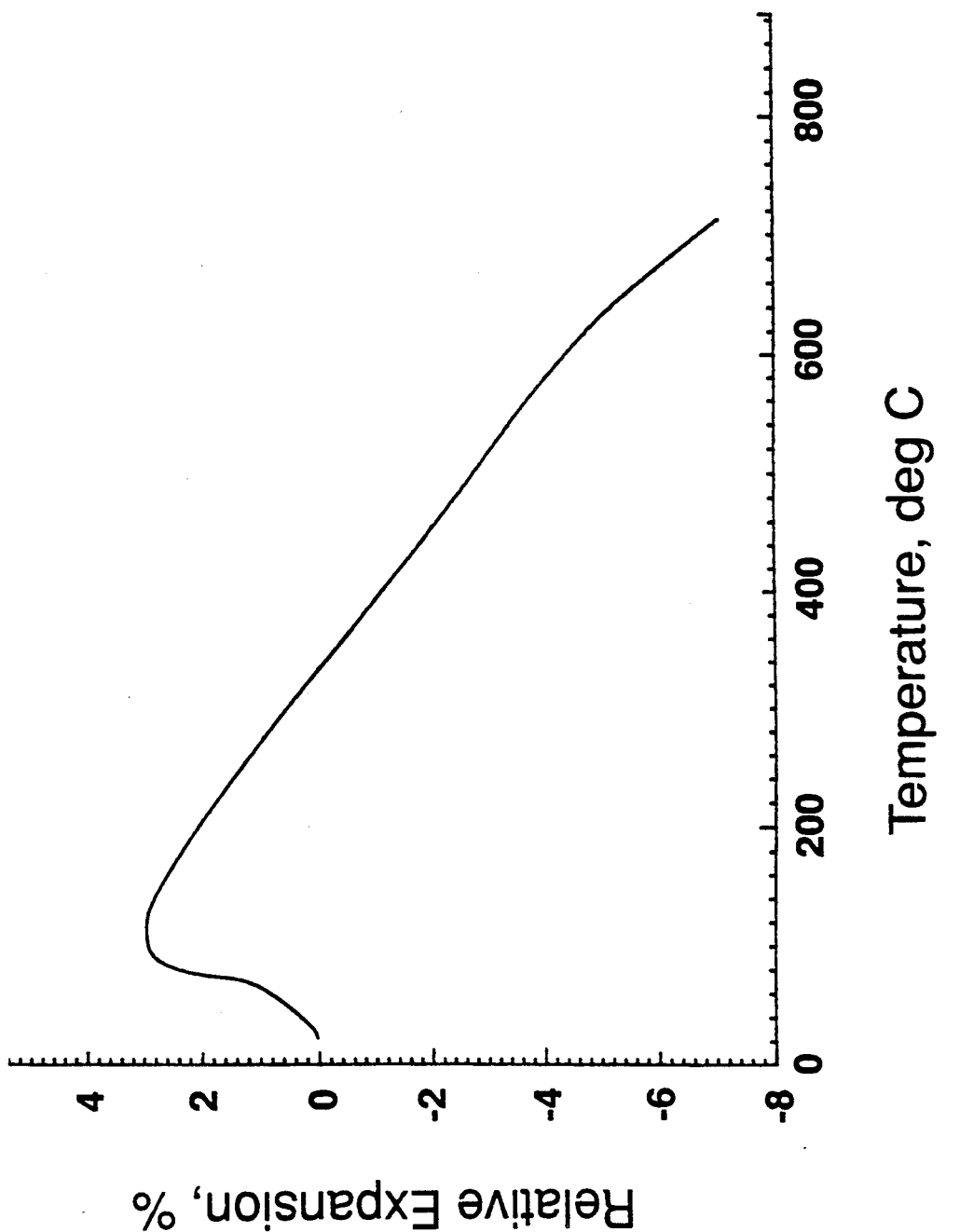
FIG. 8 is a thermal expansion curve for $HfV_{1.8}P_{0.2}O_7$, an NTE compound according to the present invention.

Similarly, FIG. 8 is a thermal expansion curve for $HfV_{1.8}P_{0.2}O_7$. The NTE onset temperature for this compound appears to occur at a temperature of about 100° C. Upon further heating above this temperature, the compound exhibits NTE behavior.

Figure 9:
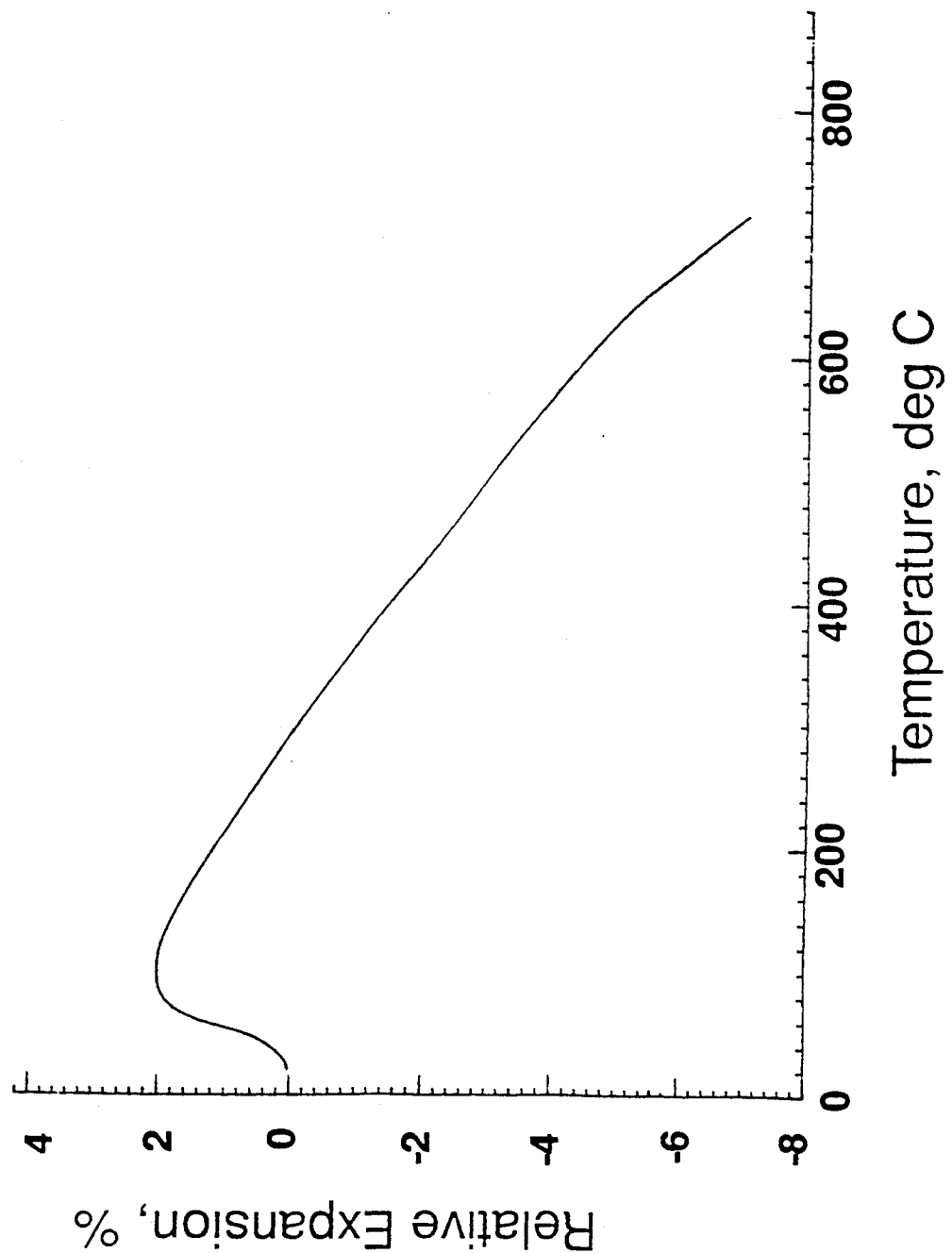
FIG. 9 is a thermal expansion curve for $HfV_{1.7}P_{0.3}O_7$, an NTE compound according to the present invention.

FIG. 9 is a thermal expansion curve for $HfV_{1.7}P_{0.3}O_7$. This compound exhibits positive thermal expansion below an onset temperature of about 80° C. However, upon continued heating above this temperature, the compound exhibits NTE behavior.

Figure 13:
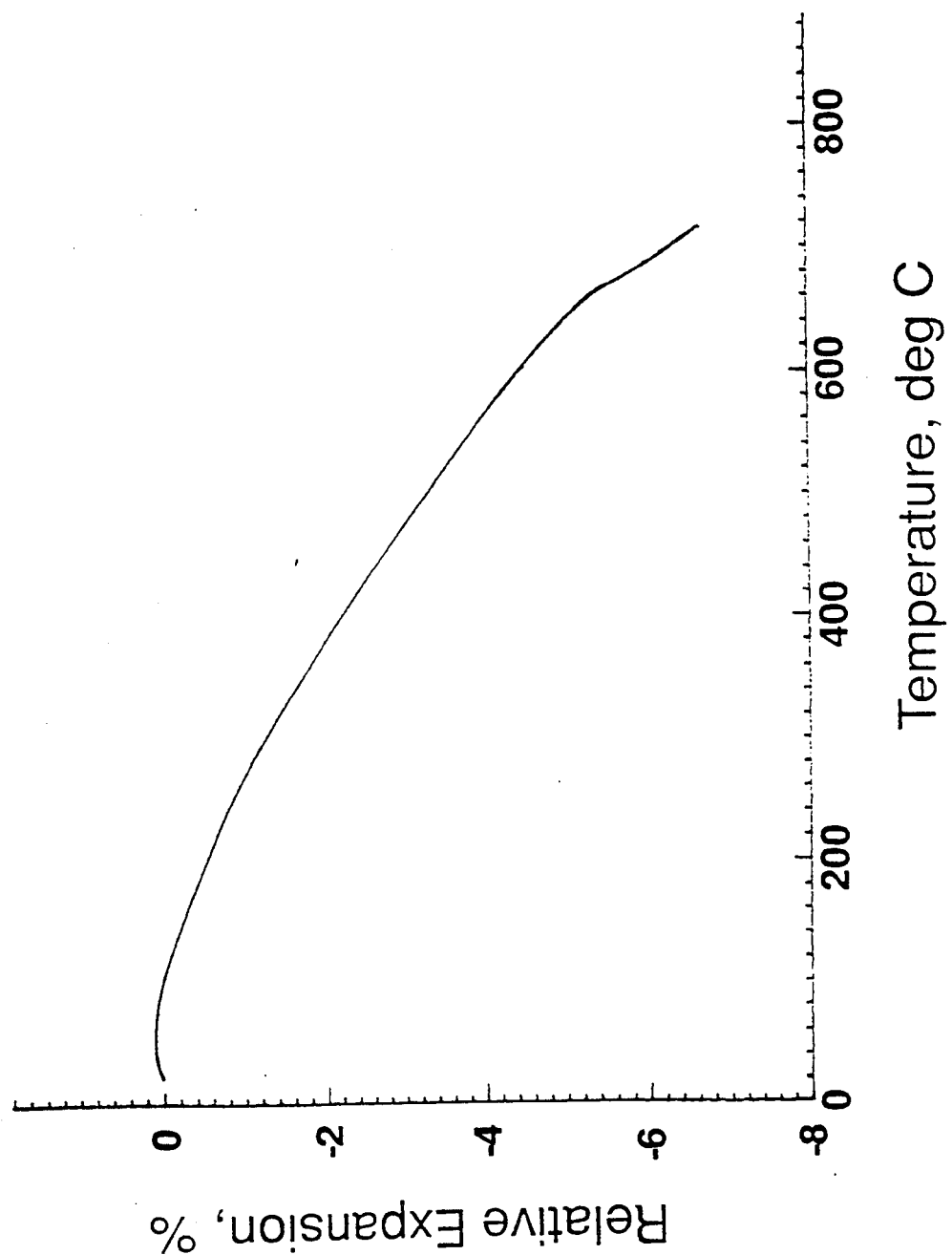
FIG. 13 is a thermal expansion curve for $HfVPO_7$, an NTE compound according to the present invention.

FIG. 13 is a thermal expansion curve for $HfVPO_7$. FIG. 13 shows that this compound has NTE beginning about room temperature and continuing throughout the tested temperature range.

Figure 14:
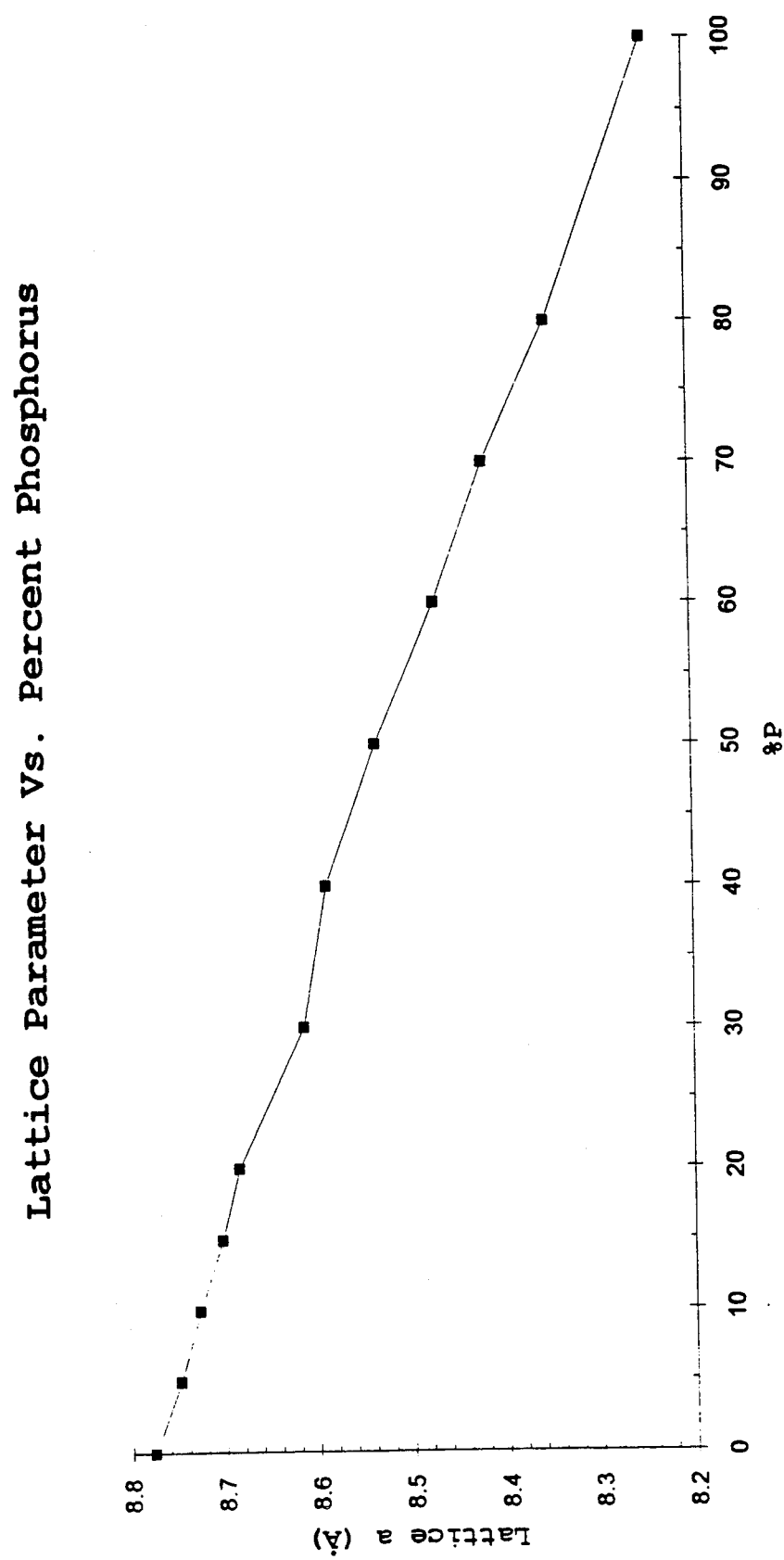
FIG. 14 is a graph showing percent phosphorous versus unit cell lattice parameters in Å.

By comparing FIGS. 7-9 and 13 it can be seen that, as the percent phosphorous increases, the NTE onset temperature decreases. FIG. 14 also shows that the size of the unit cell decreases with increasing phosphorous content.

C. Zirconium-Lithium-Yttrium NTE Compounds

Figure 10:
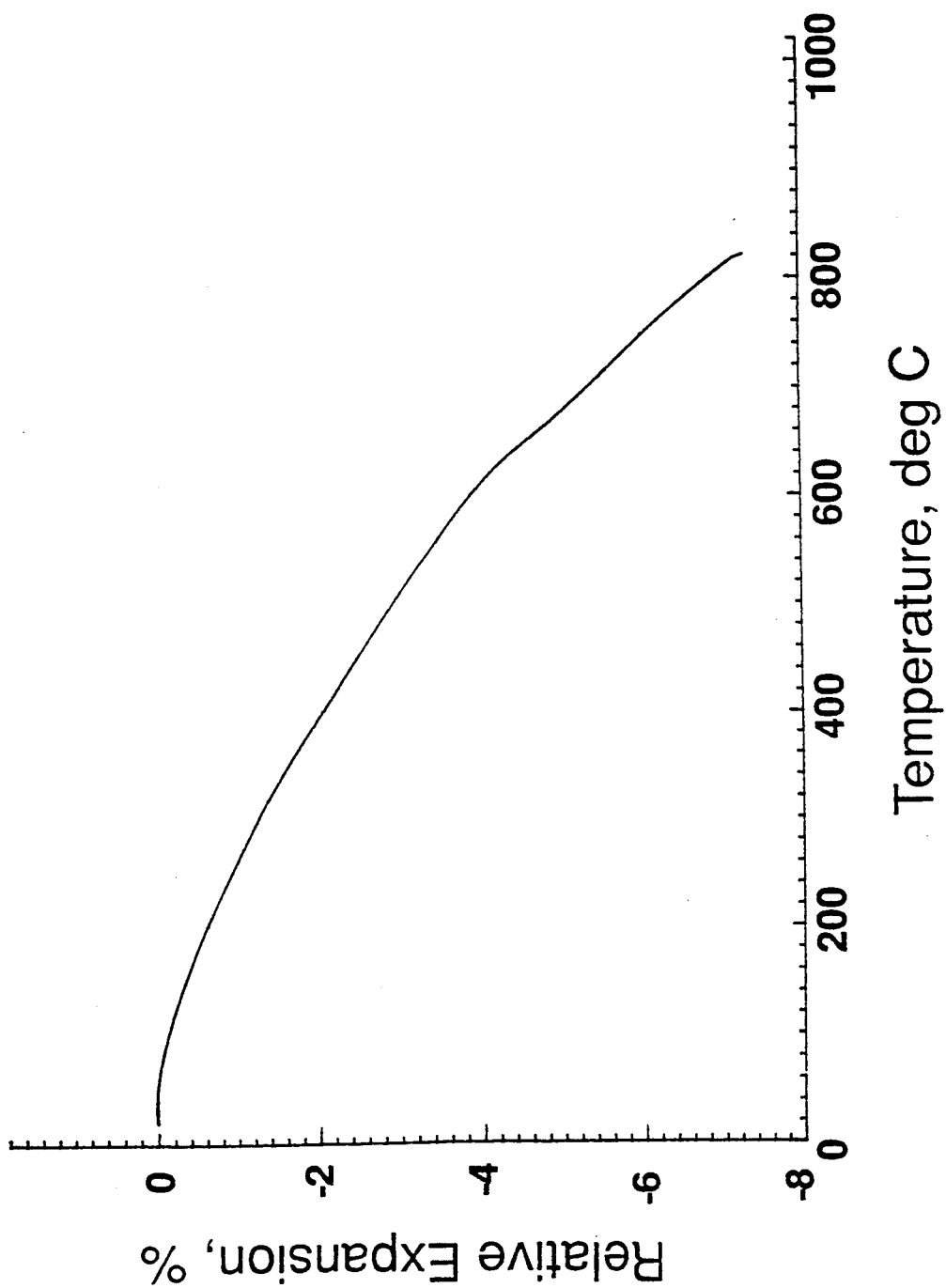
FIG. 10 is a thermal expansion curve for $Zr_{0.9}Li_{0.1}Y_{0.1}VPO_7$, an NTE compound according to the present invention.
Figure 11:
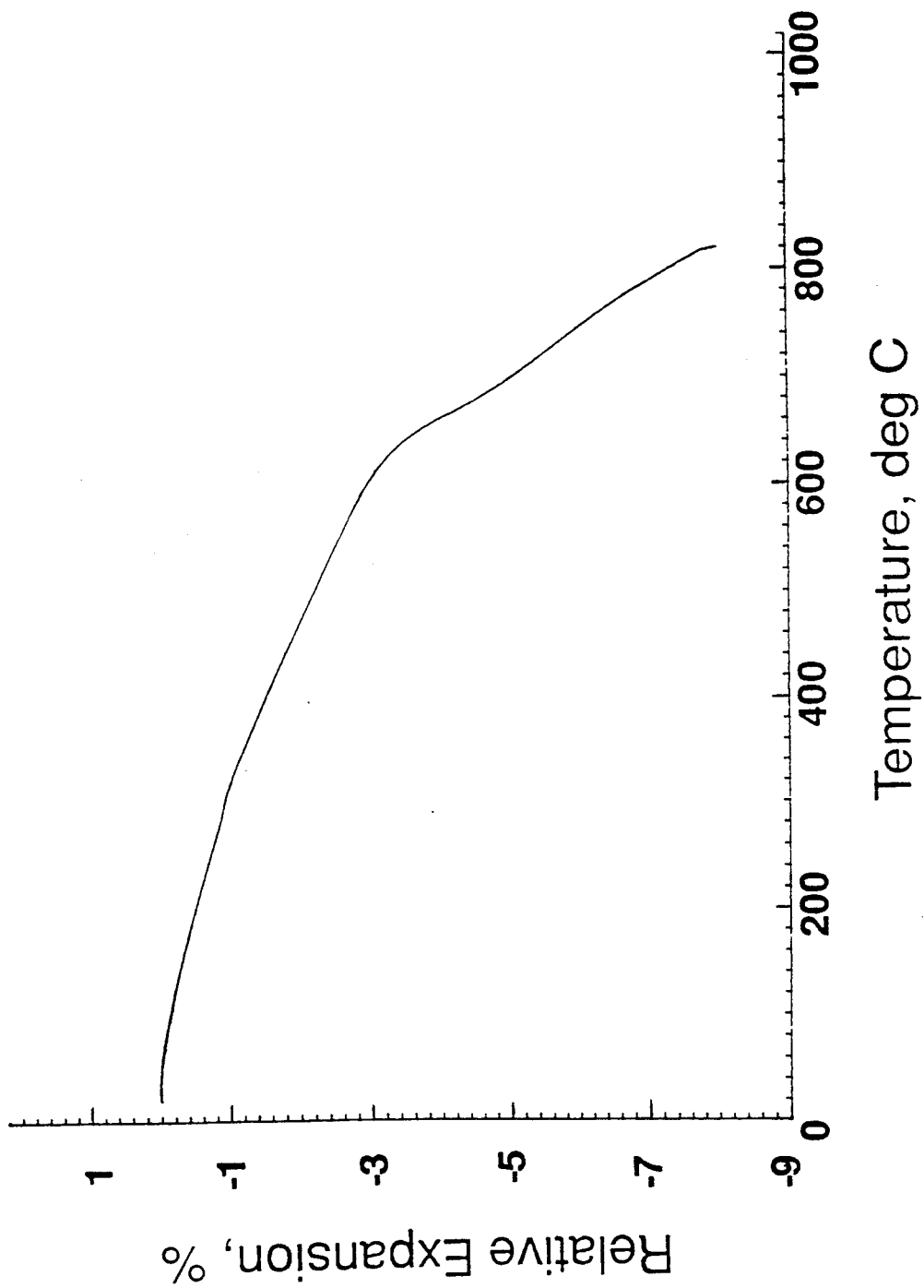
FIG. 11 is a thermal expansion curve for $Zr_{0.8}Li_{0.2}Y_{0.2}VPO_7$, an NTE compound according to the present invention.

FIGS. 10 and 11 are thermal expansion curves for NTE compounds within the scope of the present invention wherein such compounds include lithium as the $A^+$ ion and yttrium as the $A^{3+}$ ion. FIG. 10 shows that $Zr_{0.9}Li_{0.1}Y_{0.1}VPO_7$ has very little thermal expansion in the range of from about 20° C. to about 70° C. However, thereafter this compound clearly exhibits NTE behavior. This can be determined, both qualitatively and quantitatively, either by visually comparing the magnitudes of the negative slopes for respective compounds, or by actually determining the slope of the curve. For instance, the slope of the curve for $ZrVPO_7$ clearly is greater than the slope of the curve for $Zr_{0.9}Li_{0.1}Y_{0.1}VPO_7$.

$Zr_{0.8}Li_{0.2}Y_{0.2}VPO_7$ also shows a very low thermal expansion between about 20° C. to about 60° C., and thereafter this compound has a slightly negative thermal expansion.

P. Compounds having $A^{4+}$ Cations in Combination with Zr and Hf

As stated above for Example 8, compounds such as $Zr_{0.8}Ce_{0.2}VPO_7$ are within the scope of the present invention. Thus, the present invention provides compounds such as $A_{1-Y}^{4+}A_Y^1 + A_Y^3 + V_{2-X}P_XO_7$ wherein X is from about 0.1 to about 1.9 and Y is from about 0.0 to about 0.4. $A^{4+}$ is selected from the group consisting of Hf, Zr, $Zr_aM_b$, $Hf_aM_b$ and mixtures thereof wherein a plus b equals one and M is selected from the group consisting of Ti, Ce, Th, U, Mo, Pt, Pb, Sn, Ge and Si. $A^{1+}$ is selected from the group consisting of the alkali earth metals, and $A^{3+}$ is selected from the group consisting of the rare earth metals. $Zr_{0.8}Ce_{0.2}VPO_7$ satisfies the general formula with the $A^{4+}$ cation being $Zr_aM_b$, wherein M is Ce, a is 0.8 and b is 0.2, Y equals 0 and X equals 1.

Figure 12:
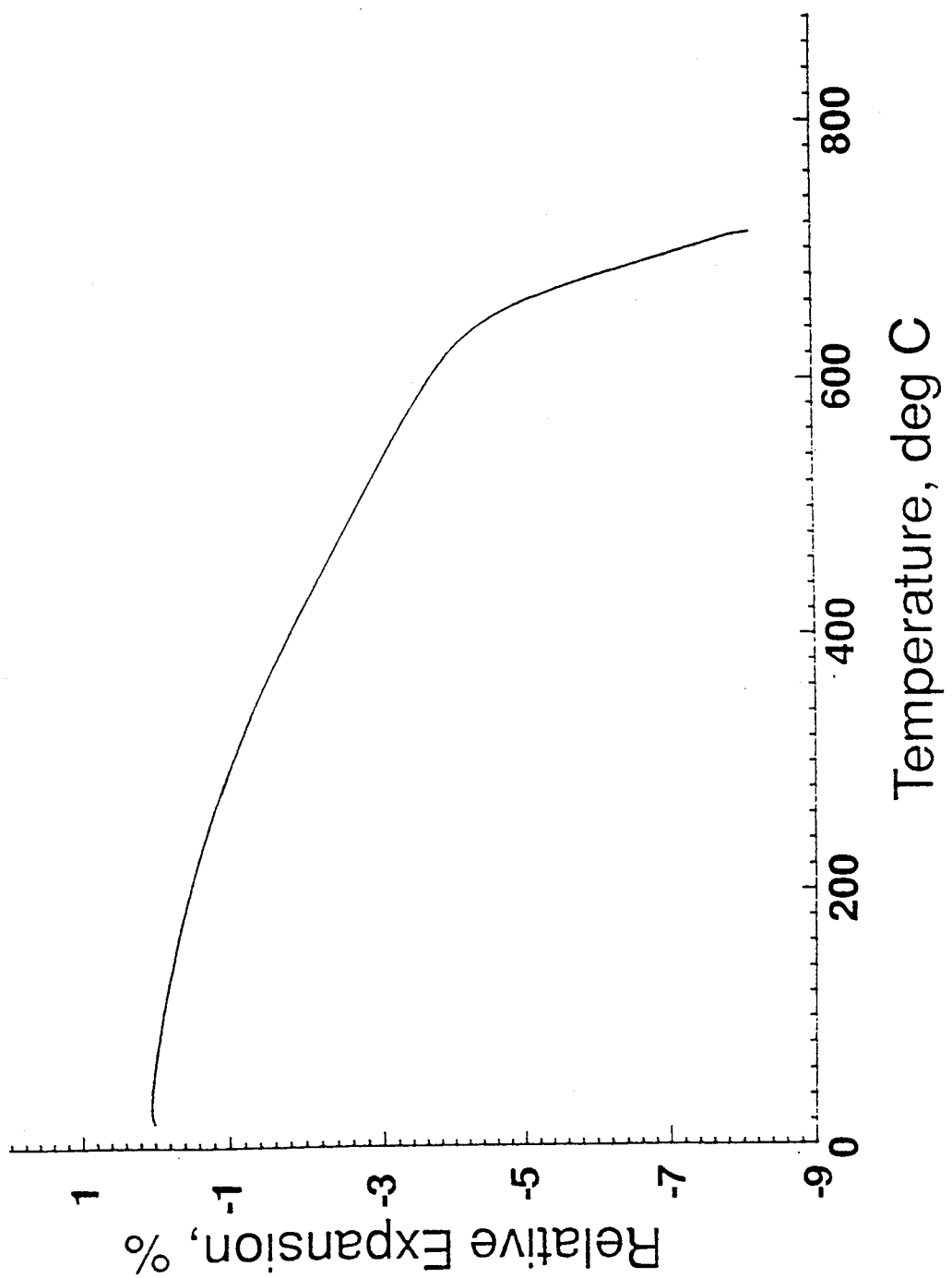
FIG. 12 is a thermal expansion curve for $Zr_{0.8}Ce_{0.2}VPO_7$, an NTE compound according to the present invention.

FIG. 12 shows a thermal expansion curve for $Zr_{0.8}Ce_{0.2}VPO_7$. FIG. 12 shows that this compound has NTE beginning about room temperature and continuing throughout the temperature range tested.

The present invention provides a homologous family of new NTE compounds. The onset temperature for each compound within the family typically varies by a small amount. The magnitude of the NTE also may vary from compound to compound. Hence, if a particular application requires a particular onset temperature and a particular NTE magnitude, then the present invention provides a means whereby the onset temperature can be selected as, to some extent, can the magnitude of the NTE behavior. For instance, by increasing the amount of phosphorous relative to the amount of vanadium, the NTE onset temperature can be lowered.

Table 3 below summarizes some of the data obtained for NTE compounds within the scope of the present invention. Table 3 includes compounds that actually have been made, the dimension of the unit cell in angstroms, the value of the thermal expansion coefficient, and phase transitions that occur and the temperatures at which the transitions occur as determined by differential scanning calorimetry.

TABLE 3

| Compound | a (Å) | $\alpha \times 10^6/°C.$ | $P_1$ (°C.) | $P_2$ (°C.) |
|---|---|---|---|---|
| $ZrV_2O_7$ | 8.777 | −191 (138°) | 77 | 102 |
| $HfV_2O_7$ | 8.751 | −156 (130) | 73 | 100 |
| $(Hf,Zr)VPO_7$ | | −185 (129) | | |
| $HfVPO_7$ | 8.495 | −88 (60) | | |
| $HfV_{1.9}P_{0.1}O_7$ | 8.721 | −171 (130) | 64 | 92 |
| $HfV_{1.8}P_{0.2}O_7$ | 8.700 | −157 (130) | | 69 |
| $HfV_{1.7}P_{0.3}O_7$ | | −136 (115) | | |
| $HfV_{1.6}P_{0.4}O_7$ | | −132 (100) | | |
| $ZrV_{0.2}P_{1.8}O_7$ | | −65 (273) | | |
| $ZrV_{0.4}P_{1.6}O_7$ | | −71 (228) | | |
| $ZrV_{0.6}P_{1.4}O_7$ | | −85 (138) | | |
| $ZrV_{0.8}P_{1.2}O_7$ | | −71 (90) | | |
| $ZrVPO_7$ | 8.534 | −120 | | |
| $ZrV_{1.2}P_{0.8}O_7$ | | −125 (64) | | |
| $ZrV_{1.5}P_{0.5}O_7$ | | | | |
| $ZrV_{1.6}P_{0.4}O_7$ | 8.783 | | | |
| $ZrV_{1.7}P_{0.3}O_7$ | 8.702 | | | 53 |
| $ZrV_{1.8}P_{0.2}O_7$ | 8.727 | −158 (121) | 48 | 67 |
| $ZrV_{1.9}P_{0.1}O_7$ | 8.748 | −173 (120) | 66 | 89 |
| $Zr_{0.9}Ce_{0.1}VPO_7$ | | −70 (37) | | |
| $Zr_{0.9}Li_{0.1}Y_{0.1}VPO_7$ | 8.528 | −70 | | |
| $Zr_{0.8}Li_{0.2}Y_{0.2}VPO_7$ | 8.524 | −55 | | | a is the length of the cubic cell edge.
α is the thermal expansion coefficient.
$P_1 + P_2$ are the phase transitions detected by DSC.

III. MECHANISM FOR NTE

Without limiting the invention to one theory of operation, it currently is believed that NTE behavior may result from the type of bonding present in a particular compound. Chemical bonds always become longer with increasing temperature. Nonetheless, a few materials show NTE behavior over some range of temperature. The way this may happen can be demonstrated in one dimension by looking at a chain of bonding atoms. Atoms typically bond either as a straight chain or with angled bonds. The straight chain is longer even if the bond distances are the same in both chains In $A^{4+}M_2^{5+}O_7$ compounds, such chains run in all three dimensions, and the chains intersect at the $A^{4+}$ site. The actual $A^{4+}$—O and $M^{5+}$—O distances presumably increase slightly with increasing temperature. However, the A—O—M and/or M—O—M angles change with increasing temperature such that the unit cell edges decrease in size. Considering only the M—O—M angle of the $(M_2O_7)^{4-}$ group, the angle ideally is 180° C. As the temperature increases, the oxygen vibrates mainly perpendicular to the M—O bonds. Thus, most of the time the M—O bond angle deviates from 180° C. . However, the M—O distance will remain essentially the same. Thus, the M—M distance becomes shorter. Without limiting the present invention to one theory of operation, this decrease in M—M distance apparently is responsible for causing NTE behavior.

IV. SUMMARY

The present invention provides compounds of the general formula $A_{1-Y}^{4+}A_Y^1 + A_Y^3 + V_{2-X}P_XO_7$, wherein X is from about 0.1 to about 1.9 and Y is from about 0.0 to about 0.4. $A^{4+}$ is selected from the group consisting of Hf, Zr, $Zr_aM_b$, $Hf_aM_b$ and mixtures thereof wherein a plus b equals one and M is selected from the group consisting of Ti, Ce, Th, U, Mo, Pt, Pb, Sn, Ge and Si. $A^{1+}$ is selected from the group consisting of the alkali earth metals and $A^{3+}$ is selected from the group consisting of the rare earth metals. Compounds according to this formula exhibit negative linear expansion at a temperature of from about −25° C. to about 100° C.

Compounds according to this formula typically are selected from the group consisting of ZrVPO$_7$, HfVPO$_7$, Zr$_{0.9}$Li$_{0.1}$Y$_{0.1}$VPO$_7$, Zr$_{0.8}$Li$_{0.2}$Y$_{0.2}$VPO$_7$, ZrV$_{1.9}$P$_{0.1}$O$_7$, ZrV$_{1.8}$P$_{0.2}$O$_7$, ZrV$_{1.7}$P$_{0.3}$O$_7$, ZrV$_{1.6}$P$_{0.4}$O$_7$, ZrV$_{1.5}$P$_{0.5}$O$_7$, ZrV$_{1.4}$P$_{0.6}$O$_7$, ZrV$_{1.2}$P$_{0.8}$O$_7$, ZrV$_{0.8}$P$_{1.2}$O$_7$, ZrV$_{0.6}$P$_{1.4}$O$_7$, ZrV$_{0.4}$P$_{1.6}$O$_7$, ZrV$_{0.2}$P$_{1.8}$O$_7$, HfV$_{1.9}$P$_{0.1}$O$_7$, HfV$_{1.8}$P$_{0.2}$O$_7$, HfV$_{1.7}$P$_{0.3}$O$_7$, HfV$_{1.6}$P$_{0.4}$O$_7$, and Zr$_{0.9}$Ce$_{0.1}$VPO$_7$. However, if X is about 1 and Y is about 0, then the compounds typically are ZrVPO$_7$ or HfVPO$_7$, which presently are preferred compounds. If A$^{4+}$ is zirconium, A$^{1+}$ is lithium, and A$^{3+}$ is yttrium, then the compounds typically are Zr$_{0.9}$Li$_{0.1}$Y$_{0.1}$VPO$_7$ or Zr$_{0.8}$Li$_{0.2}$Y$_{0.2}$VPO$_7$. If A$^{4+}$ is zirconium, X is from about 0.1 to about 1.9 and Y is about 0, then the compound typically is selected from the group consisting of ZrV$_{1.9}$P$_{0.1}$O$_7$, ZrV$_{1.8}$P$_{0.2}$O$_7$, ZrV$_{1.7}$P$_{0.3}$O$_7$, ZrV$_{1.6}$P$_{0.4}$O$_7$, ZrV$_{1.4}$P$_{0.6}$O$_7$, ZrV$_{1.2}$P$_{0.8}$O$_7$, ZrV$_{0.8}$P$_{1.2}$O$_7$, Zrv$_{0.6}$P$_{1.4}$O$_7$, ZrV$_{0.4}$P$_{1.6}$O$_7$, and ZrV$_{0.2}$P$_{1.8}$O$_7$.

The present invention also provides a compound according to the formula A$_{1-Y}^{4+}$A$_Y^{1+}$A$_Y^{3+}$V$_{2-X}$P$_X$O$_7$, wherein X is from about 0.5 to about 1.5, Y is from about 0.0 to about 0.4, and wherein A$^{4+}$ is selected from the group consisting of Hf and Zr, A$^{1+}$ is selected from the group consisting of the alkali earth metals, and A$^{3+}$ is selected from the group consisting of the rare earth metals. The value of X for such compounds preferably is from about 0.6 to about 1.4, and Y preferably is from about 0 to about 0.2. Such compounds also exhibit NTE at a temperature below about 100° C. If X is about 1 and Y is about 0, then the compound typically is ZrVPO$_7$ or HfVPO$_7$. If A$^{4+}$ is zirconium, A$^{1+}$ is lithium, and A$^{3+}$ is yttrium, then the compound typically is Zr$_{0.9}$Li$_{0.1}$Y$_{0.1}$VPO$_7$ or Zr$_{0.8}$Li$_{0.2}$Y$_{0.2}$VPO$_7$. If A$^{4+}$ is zirconium, X is from about 0.1 to about 1.9 and Y is about 0, then the compound typically is selected from the group consisting of ZrV$_{1.9}$P$_{0.1}$O$_7$, ZrV$_{1.8}$P$_{0.2}$O$_7$, ZrV$_{1.7}$P$_{0.3}$O$_7$, ZrV$_{1.6}$P$_{0.4}$O$_7$, ZrV$_{1.4}$P$_{0.6}$O$_7$, ZrV$_{1.2}$P$_{0.8}$O$_7$, ZrV$_{0.8}$P$_{1.2}$O$_7$, ZrV$_{0.6}$P$_{1.4}$O$_7$, ZrV$_{0.4}$P$_{1.6}$O$_7$ and ZrV$_{0.2}$P$_{1.8}$O$_7$. Compounds within this formula typically are selected from the group consisting of ZrVPO$_7$, HfVPO$_7$, Zr$_{0.9}$Li$_{0.1}$Y$_{0.1}$VPO$_7$, Zr$_{0.8}$Li$_{0.2}$Y$_{0.2}$VPO$_7$, ZrV$_{1.9}$P$_{0.1}$O$_7$, ZrV$_{1.8}$P$_{0.2}$O$_7$, ZrV$_{1.7}$P$_{0.3}$O$_7$, ZrV$_{1.6}$P$_{0.4}$O$_7$, ZrV$_{1.4}$P$_{0.6}$O$_7$, ZrV$_{1.2}$P$_{0.8}$O$_7$, ZrV$_{0.8}$P$_{1.2}$O$_7$, ZrV$_{0.6}$P$_{1.4}$O$_7$, ZrV$_{0.4}$P$_{1.6}$O$_7$, ZrV$_{0.2}$P$_{1.8}$O$_7$, HfV$_{1.9}$P$_{0.1}$O$_7$, HfV$_{1.8}$P$_{0.2}$O$_7$, HfV$_{1.7}$P$_{0.3}$O$_7$ and HfV$_{1.6}$P$_{0.4}$O$_7$.

Finally, the present invention provides a compound according to the formula A$_{4+}$VPO$_7$ wherein A$^{4+}$ is zirconium or hafnium. Such compounds exhibit negative thermal expansion from about −25° C. to about 100° C.

The present invention also provides a composition comprising a compound of the formula A$_{1-Y}^{4+}$A$_Y^{1+}$+A$_Y^{3+}$+V$_{2-X}$P$_X$O$_7$, wherein X is from about 0.1 to about 1.9, Y is from about 0.0 to about 0.4, and wherein A$^{4+}$ is selected from the group consisting of Hf, Zr, Zr$_a$M$_b$, Hf$_a$M$_b$ and mixtures thereof wherein a plus b equals one and M is selected from the group consisting of Ti, Cs, Th, U, Mo, Pt, Pb, Sn, Ge and Si. A$^{1+}$ is selected from the group consisting of the alkali earth metals, and A$^{3+}$ is selected from the group consisting of the rare earth metals.

The composition also may comprise a compound of the formula A$_{1-Y}^{4+}$A$_Y^{1+}$+A$_Y^{3+}$+V$_{2-X}$P$_X$O$_7$, wherein X is from about 0.1 to about 1.9 and Y is from about 0.0 to about 0.4, and wherein A$^{4+}$ is selected from the group consisting of Hf and Zr, A$^{1+}$ is selected from the group consisting of the alkali earth metals, and A$^{3+}$ is selected from the group consisting of the rare earth metals. Finally, the composition may comprise a compound of the formula A$^{4+}$VPO$^7$ wherein A$^{4+}$ is zirconium or hafnium.

The present invention also provides a method for making NTE compounds within the scope of this invention. The method comprises making a compound of the formula A$_{1-Y}^{4+}$A$_Y^{1+}$+A$_Y^{3+}$+V$_{2-X}$P$_X$O$_7$, wherein X is from about 0.1 to about 1.9 and Y is from about 0.0 to about 0.4, and wherein A$^{4+}$ is selected from the group consisting of Hf, Zr, Zr$_a$M$_b$, Hf$_a$M$_b$ and mixtures thereof wherein a plus b equals one and M is selected from the group consisting of Ti, Cs, Th, U, Mo, Pt, Pb, Sn, Ge and Si. A$^{1+}$ is selected from the group consisting of the alkali earth metals, and A$^{3+}$ is selected from the group consisting of the rare earth metals. The method comprises the steps of providing a first aqueous mixture having a source of rare earth metal ions, a source of alkali ions and a source of A$^{4+}$ ions, such as hafnium or zirconium. A second aqueous mixture is provided having a source of vanadium ions and a source of phosphorous ions. Both the first mixture and the second mixture are heated to a temperature of from about 80° C. to about 100° C. The pH of the second mixture is adjusted to be about 2 by adding a sufficient amount of an inorganic acid, such as nitric acid. The first aqueous mixture is combined with the second aqueous mixture, thereby forming a precipitate. The precipitate is heated to a temperature of about 600° C. to about 800° C., for a period of time of from about 2 hours to about 6 hours. The first aqueous mixture may comprise a source of hafnium, and the second mixture may comprise a source of vanadium and phosphorous. If so, then the source of hafnium may be HfOCl$_2$.8H$_2$O, the source of vanadium may be NH$_4$VO$_3$, and the source of phosphorous may be (NH$_4$)$_2$HPO$_4$. The first aqueous mixture may comprise a source of zirconium and the second mixture may comprise a source of vanadium and phosphorous. If so, the source of zirconium may be ZrOCl$_2$.8H$_2$O, the source of vanadium may be NH$_4$VO$_3$, and the source of phosphorous may be (NH$_4$)$_2$HPO$_4$.

The method provides compounds according to the formula A$_{1-Y}^{4+}$A$_Y^{1+}$+A$_Y^{3+}$+V$_{2-X}$P$_X$O$_7$ wherein the compounds typically are selected from the group consisting of ZrVPO$_7$, HfVPO$_7$, Ar$_{0.9}$Li$_{0.1}$Y$_{0.1}$VPO$_7$, Zr$_{0.8}$Li$_{0.2}$Y$_{0.2}$VPO$_7$, ZrV$_{1.9}$P$_{0.1}$O$_7$, ZrV$_{1.8}$P$_{0.2}$O$_7$, ZrV$_{1.7}$P$_{0.3}$O$_7$, ZrV$_{1.6}$P$_{0.4}$O$_7$, ZrV$_{1.5}$P$_{0.5}$O$_7$, ZrV$_{1.4}$P$_{0.6}$O$_7$, ZrV$_{1.2}$P$_{0.8}$O$_7$, ZrV$_{0.8}$P$_{1.2}$O$_7$, ZrV$_{0.6}$P$_{1.4}$O$_7$, ZrV$_{0.4}$P$_{1.6}$O$_7$, ZrV$_{0.2}$P$_{1.8}$O$_7$, HfV$_{1.9}$P$_{0.1}$O$_7$, HfV$_{1.8}$P$_{0.2}$O$_7$, HfV$_{1.7}$P$_{0.3}$O$_7$, HfV$_{1.6}$P$_{0.4}$O$_7$, and Zr$_{0.9}$Ce$_{0.1}$VPO$_7$.

The present invention has been described with reference to preferred embodiments. Other embodiments of the invention will be apparent to those of skill in the art from the consideration of this specification or practice of the invention disclosed herein. It is intended that the specification and examples be considered as exemplary only, with the true scope and spirit of the invention being indicated by the following claims.

I claim:

1. A compound according to the formula A$_{1-Y}^{4+}$A$_Y^{1+}$+A$_Y^{3+}$+V$_{2-X}$P$_X$O$_7$, wherein X is from about 0 1 to about 1.9, Y is from about 0.0 to about 0.4, and wherein A$^{4+}$ selected from the group consisting of Hf, Zr, Zr$_a$M$_b$, Hf$_a$M$_b$ and mixtures thereof wherein a plus b equals one and M is selected from the group consisting of Ti, Ce, Th, U, Mo, Pt, Pb, Sn, Ge and Si, A$^{1+}$ is selected from the group consisting of the alkali earth metals, and $A^{3+}$ is selected from the group consisting of the rare earth metals.

2. The compound according to claim 1 wherein X is from about 0.6 to about 1.4 and Y is from about 0.1 to about 0.2.

3. The compound according to claim 1 wherein X is about 1 and Y is about 0.2.

4. The compound according to claim 1 wherein the compound exhibits negative thermal expansion at a temperature below about 100° C.

5. The compound according to claim 4 wherein the compound exhibits negative linear expansion at a temperature of from about −25° C. to about 100° C.

6. The compound according to claim 1 wherein X is about 1 and wherein Y is about 0.

7. The compound according to claim 6 wherein the compound is $ZrVPO_7$ or $HfVPO_7$.

8. The compound according to claim 1 wherein $A^{4+}$ is zirconium, $A^{1+}$ is lithium, and $A^{3+}$ is yttrium.

9. The compound according to claim 8 wherein the compound is $Zr_{0.9}Li_{0.1}Y_{0.1}VPO_7$ or $Zr_{0.8}Li_{0.2}Y_{0.2}VPO_7$.

10. The compound according to claim 1 wherein $A^{4+}$ is zirconium, X is from about 0.1 to about 1.9 and Y is about 0.

11. The compound according to claim 10 wherein the compound is selected from the group consisting of $ZrV_{1.9}P_{0.1}O_7$, $ZrV_{1.8}P_{0.2}O_7$, $ZrV_{1.7}P_{0.3}O_7$, $ZrV_{1.6}P_{0.4}O_7$, $ZrV_{1.4}P_{0.6}O_7$, $ZrV_{1.2}P_{0.8}O_7$, $ZrV_{0.8}P_{1.2}O_7$, $ZrV_{0.6}P_{1.4}O_7$, $ZrV_{0.4}P_{1.6}O_7$, and $ZrV_{0.2}P_{1.8}O_7$.

12. The compound according to claim 1 wherein the compound is selected from the group consisting of $ZrVPO_7$, $HfVPO_7$, $Zr_{0.9}Li_{0.1}Y_{0.1}VPO_7$, $Zr_{0.8}Li_{0.2}Y_{0.2}VPO_7$, $ZrV_{1.9}P_{0.1}O_7$, $ZrV_{1.8}P_{0.2}O_7$, $ZrV_{1.7}P_{0.3}O_7$, $ZrV_{1.6}P_{0.4}O_7$, $ZrV_{1.5}P_{0.5}O_7$, $ZrV_{1.4}P_{0.6}O_7$, $ZrV_{1.2}P_{0.8}O_7$, $ZrV_{0.8}P_{1.2}O_7$, $ZrV_{0.6}P_{1.4}O_7$, $ZrV_{0.4}P_{1.6}O_7$, $ZrV_{0.2}P_{1.8}O_7$, $HfV_{1.9}P_{0.1}O_7$, $HfV_{1.8}P_{0.2}O_7$, $HfV_{1.7}P_{0.3}O_7$, $HfV_{1.6}P_{0.4}O_7$, and $Zr_{0.9}Ce_{0.1}VPO_7$.

13. A compound according to the formula $A_{1-Y}^{4+}A_Y^{1+}A_Y^{3+}V_{2-X}P_XO_7$, wherein X is from about 0 5 to about 1.5, Y is from about 0.0 to about 0.4, and wherein $A^{4+}$ is selected from the group consisting of Hf and Zr, $A^{1+}$ is selected from the group consisting of the alkali earth metals, and $A^{3+}$ is selected from the group consisting of the rare earth metals.

14. The compound according to claim 13 wherein X is from about 0.6 to about 1.4 and Y is from about 0 to about 0.2.

15. The compound according to claim 14 wherein X is about 1 and Y is about 0.1 to about 0.2.

16. The compound according to claim 13 wherein the compound exhibits negative thermal expansion at a temperature below about 100° C.

17. The compound according to claim 13 wherein X is about 1 and Y is about 0.

18. The compound according to claim 17 wherein the compound is $ZrVPO_7$ or $HfVPO_7$.

19. The compound according to claim 13 wherein $A^{4+}$ is zirconium, $A^{1+}$ is lithium, and $A^{3+}$ is yttrium.

20. The compound according to claim 19 wherein the compound is $Zr_{0.9}Li_{0.1}Y_{0.1}VPO_7$ or $Zr_{0.8}Li_{0.2}Y_{0.2}VPO_7$.

21. The compound according to claim 13 wherein $A^{4+}$ is zirconium, X is from about 0.1 to about 2.0 and Y is about 0.

22. The compound according to claim 21 wherein the compound is selected from the group consisting of $ZrV_{1.9}P_{0.1}O_7$, $ZrV_{1.8}P_{0.2}O_7$, $ZrV_{1.7}P_{0.3}O_7$, $ZrV_{1.6}P_{0.4}O_7$, $ZrV_{1.4}P_{0.6}O_7$, $ZrV_{1.2}P_{0.8}O_7$, $ZrV_{0.8}P_{1.2}O_7$, $ZrV_{0.6}P_{1.4}O_7$, $ZrV_{0.4}P_{1.6}O_7$ and $ZrV_{0.2}P_{1.8}O_7$.

23. The compound according to claim 13 wherein the compound is selected from the group consisting of $ZrVPO_7$, $HfVPO_7$, $Zr_{0.9}Li_{0.1}Y_{0.1}VPO_7$, $Zr_{0.8}Li_{0.2}Y_{0.2}VPO_7$, $ZrV_{1.9}P_{0.1}O_7$, $ZrV_{1.8}P_{0.2}O_7$, $ZrV_{1.7}P_{0.3}O_7$, $ZrV_{1.6}P_{0.4}O_7$, $ZrV_{1.4}P_{0.6}O_7$, $ZrV_{1.2}P_{0.8}O_7$, $ZrV_{0.8}P_{1.2}O_7$, $ZrV_{0.6}P_{1.4}O_7$, $ZrV_{0.4}P_{1.6}O_7$, $ZrV_{0.2}P_{1.8}O_7$, $HfV_{1.9}P_{0.1}O_7$, $HfV_{1.8}P_{0.2}O_7$, $HfV_{1.7}P_{0.3}O_7$ and $HfV_{1.6}P_{0.4}O_7$.

24. A compound according to the formula $A^{4+}VPO_7$ wherein $A^{4+}$ is zirconium or hafnium.

25. The compound according to claim 23 wherein the compound exhibits negative thermal expansion from about −25° C. to about 100° C.

26. A composition comprising a compound of the formula $A_{1-Y}^{4+}A_Y^{1+}A_Y^{3+}V_{2-X}P_XO_7$, wherein X is from about 0.1 to about 1.9, Y is from about 0.0 to about 0.4, and wherein $A^{4+}$ is selected from the group consisting of Hf, Zr, $Zr_aM_b$, $Hf_aM_b$ and mixtures thereof wherein a plus b equals one and M is selected from the group consisting of Ti, Ce, Th, U, Mo, Pt, Pb, Sn, Ge and Si, $A^{1+}$ is selected from the group consisting of the alkali earth metals, and $A^{3+}$ is selected from the group consisting of the rare earth metals.

27. A composition comprising a compound of the formula $A_{1-Y}^{4+}A_Y^{1+}A_Y^{3+}V_{2-X}P_XO_7$, wherein X is from about 0 i to about 1.9 and Y is from about 0.0 to about 0.4, and wherein $A^{4+}$ is selected from the group consisting of Hf and Zr, $A^{1+}$ is selected from the group consisting of the alkali earth metals, and $A^{3+}$ is selected from the group consisting of the rare earth metals.

28. A composition comprising a compound of the formula $A^{4+}VPO_7$ wherein $A^{4+}$ is zirconium or hafnium.

29. A method for making a compound of the formula $A_{1-Y}^{4+}A_Y^{1+}A_Y^{3+}V_{2-X}P_XO_7$, wherein X is from about 0.1 to about 1.9 and Y is from about 0.0 to about 0.4, and wherein $A^{4+}$ is selected from the group consisting of Hf, Zr, $Zr_aM_b$, $Hf_aM_b$ and mixtures thereof wherein a plus b equals one and M is selected from the group consisting of Ti, Ce, Th, U, Mo, Pt, Pb, Sn, Ge and Si, $A^{1+}$ is selected from the group consisting of the alkali earth metals, and $A^{3+}$ is selected from the group consisting of the rare earth metals, the method comprising the steps of:

providing a first aqueous mixture having a source of rare earth metals, a source of alkali metals, and a source of $A^{4+}$;

providing a second aqueous mixture having a source of vanadium and a source of phosphorous;

heating both the first mixture and the second mixture to a temperature of from about 80° C. to about 100° C.;

adjusting the pH of the second mixture to be about 2 by adding a sufficient amount of an inorganic acid;

combining the first aqueous mixture with the second aqueous mixture, thereby forming a precipitate; and heating the precipitate to a temperature of about 600° C. to about 800° C., for a period of time of from about 2 hours to about 6 hours.

30. The method according to claim 28 wherein the first aqueous mixture comprises a source of hafnium, and the second mixture comprises a source of vanadium and phosphorous.

31. The method according to claim 29 wherein the source of hafnium is $HfOCl_2.8H_2O$, the source of vanadium is $NH_4VO_3$, and the source of phosphorous is $(NH_4)_2HPO_4$.

32. The method according to claim 28 wherein the first aqueous mixture comprises a source of zirconium and the second mixture comprises a source of vanadium and phosphorous.

33. The method according to claim 31 wherein source of zirconium is $ZrOCl_2.8H_2O$, the source of vanadium is $NH_4VO_3$, and the source of phosphorous is $(NH_4)_2HPO_4$.

34. The method according to claim 28 wherein the compound according to the formula $A_{1-y}^{4+}A_y^{1+}+A_y^{3+}V_{2-x}P_xO_7$ is selected from the group consisting of $ZrVPO_7$, $HfVPO_7$, $Zr_{0.9}Li_{0.1}Y_{0.1}VPO_7$, $Zr_{0.8}Li_{0.2}Y_{0.2}VPO_7$, $ZrV_{1.9}P_{0.1}O_7$, $ZrV_{1.8}P_{0.2}O_7$, $ZrV_{1.7}P_{0.3}O_7$, $ZrV_{1.6}P_{0.4}O_7$, $ZrV_{1.5}P_{0.5}O_7$, $ZrV_{1.4}P_{0.6}O_7$, $ZrV_{1.2}P_{0.8}O_7$, $ZrV_{0.8}P_{1.2}O_7$, $ZrV_{0.6}P_{1.4}O_7$, $ZrV_{0.4}P_{1.6}O_7$, $ZrV_{0.2}P_{1.8}O_7$, $HfV_{1.9}P_{0.1}O_7$, $HfV_{1.8}P_{0.2}O_7$, $HfV_{1.7}P_{0.3}O_7$, $HfV_{1.6}P_{0.4}O_7$, and $Zr_{0.9}Ce_{0.1}VPO_7$.

* * * * *

UNITED STATES PATENT AND TRADEMARK OFFICE
CERTIFICATE OF CORRECTION

PATENT NO. : 5,322,559
DATED : June 21, 1994
INVENTOR(S) : Sleight

It is certified that error appears in the above-identified patent and that said Letters Patent is hereby corrected as shown below:

Title page,
Line 1-2, ABSTRACT, error reads: "$A_{1-y}{}^{4+}Ay^{1+}Ay^{3+}V_{2-x}P_xO_7$" should read:
-- $A^{4+}_{1-Y}A^{1+}_Y A^{3+}_Y V_{2-X}P_X O_7$ --.

Column 1,
Line 35, error reads: "science," should read: -- Science, --.

Column 2,
Line 6, error reads: "$Li_2O.Al_2O_3.2SiO_2$" should read: -- $Li_2O \cdot Al_2O_3 \cdot 2SiO_2$ --.
Line 33, error reads: "Cs" should read: -- Ce --.
Line 38, error reads: "Na+" should read: -- $Na^+$ --.

Column 3,
Line 2-3, error reads: "$A_{1-y}{}^{4+}Ay^{1+}Ay^{3+}V_{2-x}P_xO_7$" should read: -- $A^{4+}_{1-Y}A^{1+}_Y A^{3+}_Y V_{2-X}P_X O_7$ --.
Line 3, error reads: "0 0 to about 0 4," should read -- 0.0 to about 0.4, --.
Line 26, error reads: "$A_{1-y}{}^{4+}Ay^{1+}Ay^{3+}V_{2-x}P_xO_7$" should read: -- $A^{4+}_{1-Y}A^{1+}_Y A^{3+}_Y V_{2-X}P_X O_7$ --.

Column 4,
Line 11, error reads: "$A_{1-y}{}^{4+}Ay^{1+}Ay^{3+}V_{2-x}P_xO_7$" should read: -- $A^{4+}_{1-Y}A^{1+}_Y A^{3+}_Y V_{2-X}P_X O_7$ --.
Lines 19-20 error reads: "$A_{1-y}{}^{4+}Ay^{1+}Ay^{3+}V_{2-x}P_xO_7$" should read:
-- $A^{4+}_{1-Y}A^{1+}_Y A^{3+}_Y V_{2-X}P_X O_7$ --.

Line 36, error reads: "FIG. 17" should read: -- FIG. 7 --.
Lines 60-61, error reads: "$A_{1-y}{}^{4+}Ay^{1+}Ay^{3+}V_{2-x}P_xO_7$" should read:
-- $A^{4+}_{1-Y}A^{1+}_Y A^{3+}_Y V_{2-X}P_X O_7$ --.

Column 5,
Line 19, error reads: "MAKING NTE" should read -- I. Making NTE --.
Line 20, error reads: General Synthetic" should read -- A. General Synthetic --.

Column 9,
Line 26, error reads: "$ZrV_{0.6}P_{1.4}O_7$" should read -- $ZrV_{0.6}P_{1.4}O_7$ --.
Line 28, error reads: "$HfV_{1.7}P_{0.3}O_7$" should read -- $HfV_{1.7}P_{0.3}O_7$ --.
Line 30, error reads: "$(NH_4)_2HPO_4$in" should read -- $(NH_4)_2HPO_4$ in --.

UNITED STATES PATENT AND TRADEMARK OFFICE
CERTIFICATE OF CORRECTION

PATENT NO. : 5,322,559
DATED : June 21, 1994
INVENTOR(S) : Sleight

It is certified that error appears in the above-identified patent and that said Letters Patent is hereby corrected as shown below:

Column 10,
Line 29, error reads: "NH4VO3" should read -- $NH_4VO_3$ --.
Line 63, error reads: "A4+" should read -- $A^{4+}$ --.

Column 11,
Line 1, error reads: "$A_{1-y}^{4+}Ay^{1+}Ay^{3+}V_{2-x}P_xO_7$" should read: -- $A_{1-Y}^{4+}A_Y^{1+}A_Y^{3+}V_{2-x}P_xO_7$ --.
Line 4, error reads: "Cs" should read -- Ce --.

Column 12,
Line 11, error reads: "$(ZrO)_{VPO7}$" should read -- $(ZrO)_2\ VPO_7$ --.

Column 13,
Line 1, error reads: "7-9 and 13" should read -- 7-9 and 13 --.
Line 8, error reads: "10 and 11" should read -- 10 and 11 --.
Line 27, error reads: "P. Compounds having" should read -- D. Compounds having --.
Line 33, error reads: "wherein" should read -- , wherein --.
Line 33, error reads "$A_{1-y}^{4+}Ay^{1+}Ay^{3+}V_{2-x}P_xO_7$" should read: -- $A_{1-Y}^{4+}A_Y^{1+}A_Y^{3+}V_{2-x}P_xO_7$ --.

Column 14,
Line 38, error reads: "chains In $A^{4+}$" should read -- chains. In $A^{4+}$ --.
Line 46 and 49, error reads: "180° C." should read -- 180°. --.
Line 58, error reads: "$A_{1-y}^{4+}Ay^{1+}Ay^{3+}V_{2-x}P_xO_7$" should read: -- $A_{1-Y}^{4+}A_Y^{1+}A_Y^{3+}V_{2-x}P_xO_7$ --.

Column 15,
Line 2, error reads: "ZrVPOT" should read -- $ZrVPO_7$ --.
Line 4, error reads: "$ZrV_{1.8}P_{0.2}O_7$" should read -- $ZrV_{1.8}P_{0.2}O_7$ --.
Line 7, error reads: "$HfV_{1.9}P_{0.1}O_7$" should read: -- $HfV_{1.9}P_{0.1}O_7$ --.
Line 9, error reads: "about i and" should read -- about 1 and --.
Line 19, error reads: "$Zrv_{0.6}P_{1.4}O_7$" should read: -- $ZrV_{0.6}P_{1.4}O_7$ --.
Line 22, error reads: "$A_{1-y}^{4+}Ay^{1+}Ay^{3+}V_{2-x}P_xO_7$" should read: -- $A_{1-Y}^{4+}A_Y^{1+}A_Y^{3+}V_{2-x}P_xO_7$ --.

Line 39, error reads: "$ZrV_{1.4}P_{0.6}O_7$" should read -- $ZrV_{1.4}P_{0.6}O_7$ --.
Line 44, error reads: "$ZrV_{1.8}P_{0.2}O_7$" should read -- $ZrV_{1.8}P_{0.2}O_7$ --.
Line 47, error reads: "$HfV_{1.8}P_{0.2}O_7$" should read: -- $HfV_{1.8}P_{0.2}O_7$ --.
Line 50, error reads: "$A4+VPO_7$" should read: -- $A_{4+}VPO_7$ --.
Lines 55-56, error reads: "$A_{1-y}^{4+}Ay^{1+}Ay^{3+}V_{2-x}P_xO_7$" should read:
-- $A_{1-Y}^{4+}A_Y^{1+}A_Y^{3+}V_{2-x}P_xO_7$ --.

Line 59, error reads: "$Hf_aM_b$and" should read: -- $Hf_aM_b$ and --.
Line 60, error reads: "Cs" should read -- Ce --.
Line 66, error reads: "$A_{1-y}^{4+}Ay^{1+}Ay^{3+}V_{2-x}P_xO_7$" should read: -- $A_{1-Y}^{4+}A_Y^{1+}A_Y^{3+}V_{2-x}P_xO_7$ --.

UNITED STATES PATENT AND TRADEMARK OFFICE
CERTIFICATE OF CORRECTION

PATENT NO. : 5,322,559
DATED : June 21, 1994
INVENTOR(S) : Sleight

It is certified that error appears in the above-identified patent and that said Letters Patent is hereby corrected as shown below:

Column 16,
Line 5, error reads: "$A^{4+}VPO^{7}$" should read -- $A^{4+}VPO_7$ --.
Line 10, error reads: "$A_{1-y}{}^{4+}A_y{}^{1+}A_y{}^{3+}V_{2-x}P_xO_7$" should read: -- $A^{4+}_{1-Y}A^{1+}_{Y}A^{3+}_{Y}V_{2-X}P_XO_7$ --.
Line 13, error reads: "ZraMb" should read -- $Zr_aM_b$ --.
Line 13, error reads: HfaMb" should read: -- $Hf_aM_b$ --.
Line 15, error reads: Cs" should read -- Ce --.
Line 45, error reads: "$A_{1-y}{}^{4+}A_y{}^{1+}A_y{}^{3+}V_{2-x}P_xO_7$" should read: -- $A^{4+}_{1-Y}A^{1+}_{Y}A^{3+}_{Y}V_{2-X}P_XO_7$ --.
Line 47, error reads: "$Ar_{0.9}Li_{0.1}Y_{0.1}VPO_7$" shoud read: -- $Zr_{0.9}Li_{0.1}Y_{0.1}VPO_7$ --.
Line 51, error reads: "$HfV_{1.9}P_{0.1}O_7$" should read: -- $HfV_{1.8}P_{0.2}O_7$ --.
Line 62-63, error reads: "$A_{1-y}{}^{4+}A_y{}^{1+}A_y{}^{3+}V_{2-x}P_xO_7$" should read:

-- $A^{4+}_{1-Y}A^{1+}_{Y}A^{3+}_{Y}V_{2-X}P_XO_7$ --.

Line 63, error reads: "0 1" should read -- 0.1 --.
Line 64, error reads: -- "$A^{4+}$ selected" should read: -- $A^{4+}$ is selected --.

Column 17,
Line 30, error reads: "$ZrV_{1.4}P_{0.6}O_7$" should read -- $ZrV_{1.4}P_{0.6}O_7$ --.
Line 38, error reads: "$ZrV_{1.5}P_{0.5}O_7$" should read -- $ZrV_{1.5}P_{0.5}O_7$ --.
Line 41, error reads: "$HfV_{1.6}P_{0.4}O_7$" should read -- $HfV_{1.6}P_{0.4}O_7$ --.
Line 42-43, error reads: "$A_{1-y}{}^{4+}A_y{}^{1+}A_y{}^{3+}V_{2-x}P_xO_7$" should read:

-- $A^{4+}_{1-Y}A^{1+}_{Y}A^{3+}_{Y}V_{2-X}P_XO_7$ --.

Line 43, error reads: "0 5" should read -- 0.5 --.
Line 46, error reads: "A1+" should read -- $A^{1+}$ --.

Column 18,
Line 4, error reads: "$ZrV_{1.4}P_{0.6}O_7$" should read -- $ZrV_{1.4}P_{0.6}O_7$ --.
Line 11, error reads: "$ZrV_{1.4}P_{0.6}O_7$" should read -- $ZrV_{1.4}P_{0.6}O_7$ --.
Line 27, error reads: "A1+" should read -- $A^{1+}$ --.
Line 27, error reads: "$A_{1-y}{}^{4+}A_y{}^{1+}A_y{}^{3+}V_{2-x}P_xO_7$" should read: -- $A^{4+}_{1-Y}A^{1+}_{Y}A^{3+}_{Y}V_{2-X}P_XO_7$ --.
Line 32, error reads: "0 I" should read: -- 0.1 --.
Line 41, error reads: "$A_{1-y}{}^{4+}A_y{}^{1+}A_y{}^{3+}V_{2-x}P_xO_7$" should read: -- $A^{4+}_{1-Y}A^{1+}_{Y}A^{3+}_{Y}V_{2-X}P_XO_7$ --.

Line 67, error reads: "according to claims 28" should read: -- according to claim 29 --.

UNITED STATES PATENT AND TRADEMARK OFFICE
CERTIFICATE OF CORRECTION

PATENT NO. : 5,322,559
DATED : June 21, 1994
INVENTOR(S) : Sleight

It is certified that error appears in the above-identified patent and that said Letters Patent is hereby corrected as shown below:

Column 19,
Line 3, error reads: "according to claim 29" should read -- according to claim 30 --.
Line 7, error reads: "according to claim 28" should read -- according to claim 29 --.
Line 11, error reads: "according to claim 31" should read: -- according to claim 32 --.

Column 20,
Line 2, error reads: "according to claim 28" should read -- according to claim 29 --.
Line 5, error reads: "$A_{1-y}^{4+}Ay^{1+}Ay^{3+}V_{2-x}P_xO_7$" should read:
-- $A_{1-Y}^{4+}A_Y^{1+}A_Y^{3+}V_{2-X}P_XO_7$ --.

Line 10, error reads: "$HfV_{1.9}P_{0.1}O_7$" should read -- $HfV_{1.9}P_{0.1}O_7$ Signed and Sealed this Twentieth Day of November, 2001

*Attest:*

Nicholas P. Godici

NICHOLAS P. GODICI
*Attesting Officer*   *Acting Director of the United States Patent and Trademark Office*